US008705855B2

(12) United States Patent
Tsukada

(10) Patent No.: US 8,705,855 B2
(45) Date of Patent: Apr. 22, 2014

(54) COLOR IMAGE PROCESSING METHOD, COLOR IMAGE PROCESSING DEVICE, AND COLOR IMAGE PROCESSING PROGRAM

(75) Inventor: Masato Tsukada, Tokyo (JP)

(73) Assignee: NEC Corporation, Tokyo (JP)

( * ) Notice: Subject to any disclaimer, the term of this patent is extended or adjusted under 35 U.S.C. 154(b) by 435 days.

(21) Appl. No.: 13/143,394

(22) PCT Filed: Jan. 27, 2010

(86) PCT No.: PCT/JP2010/000458
§ 371 (c)(1),
(2), (4) Date: Jul. 6, 2011

(87) PCT Pub. No.: WO2010/087162
PCT Pub. Date: Aug. 5, 2010

(65) Prior Publication Data
US 2011/0274351 A1   Nov. 10, 2011

(30) Foreign Application Priority Data

Jan. 27, 2009  (JP) .................................. 2009-015120

(51) Int. Cl.
*G06K 9/00*       (2006.01)

(52) U.S. Cl.
USPC .......................................................... 382/167

(58) Field of Classification Search
USPC ................... 382/167, 154, 254, 274; 348/223.1–225.1, 602–603
See application file for complete search history.

(56) References Cited

U.S. PATENT DOCUMENTS 7,002,623 B1 *  2/2006  Ohyama et al. ............. 348/225.1
7,688,363 B2 *  3/2010  Sato et al. .................. 348/240.2

(Continued)

FOREIGN PATENT DOCUMENTS

EP    1 906 674 A1    4/2008
JP    10-229499 A     8/1998

(Continued)

OTHER PUBLICATIONS

Charles Dubout et al., "Face Image Enhancement Using 3D and Special Information", Image Processing (ICIP), 2009 16th IEEE International Conference on, IEEE, Piscataway, NY, USA, Nov. 7, 2009, pp. 697-700, XP031628998, ISBN: 978-1-4244-5653-6.

(Continued)

*Primary Examiner* — Ishrat I Sherali
(74) *Attorney, Agent, or Firm* — Sughrue Mion, PLLC

(57) ABSTRACT

To provide a color image processing method and device to realize desired color reproduction of the object area of a specific object in a color image taken by a color imaging device and thereby to improve the texture. A color image processing device (100) comprises an image information acquisition unit (110) that detects an object area based on an input image, and obtains color information and 3D information of the object area, a reflection information restoration unit (120) that restores a specular component and a body reflection component containing shade of the object area based on the color information and the 3D information, an albedo calculation unit (130) that calculates an albedo by removing the specular component and the shade in the body reflection component from the color information, an albedo correction processing unit (140) that restores a surface reflectance by using the color information and the albedo, and calculates a corrected albedo by correcting the albedo using the surface reflectance, and a reproduced-color calculation unit (150) that calculates a reproduced color of the object area by adding the shade in the body reflection component and specular component to the corrected albedo, and thereby generating an output image.

19 Claims, 11 Drawing Sheets

(56) References Cited

U.S. PATENT DOCUMENTS

| | | | |
|---|---|---|---|
| 8,025,408 B2* | 9/2011 | Sato et al. | 353/20 |
| 8,457,389 B2* | 6/2013 | Ishiyama | 382/154 |
| 8,538,144 B2* | 9/2013 | Benitez et al. | 382/167 |
| 2006/0227137 A1 | 10/2006 | Weyrich et al. | |
| 2010/0290697 A1* | 11/2010 | Benitez et al. | 382/154 |
| 2011/0274351 A1* | 11/2011 | Tsukada | 382/167 |

FOREIGN PATENT DOCUMENTS

| | | |
|---|---|---|
| JP | 2001092956 A | 4/2001 |
| JP | 3264273 B | 3/2002 |
| JP | 2003317084 A | 11/2003 |
| JP | 2004045189 A | 2/2004 |
| JP | 2006277748 A | 10/2006 |
| JP | 2008225970 A | 9/2008 |
| JP | 2008225971 A | 9/2008 |
| WO | 2009/104787 A1 | 8/2009 |

OTHER PUBLICATIONS

The Extended European Search Report for EP Application No. 10735634.7 dated on Jul. 19, 2013.

International Search Report for PCT/JP2010/000458 mailed Feb. 23, 2010.

T. Hosoi et al., "Face detection based on Generalized LVQ". FIT2002, I-30, 2002.

J. Tajima, "Image engineering series 10, Color image reproduction theory, Fundamentals of color management", Maruzen Co., Ltd. Sep. 30, 1996, pp. 33-39.

R. Ishiyama, "Recognition of Non Frontal Facial Images by Pose Conversion using Generic 3D Face Model", IEICE, General Conference 2007, D-12-085, 2007, p. 201.

R. Basri et al., "Lambertian Reflectance and Linear Subspaces", Weizmann Institute of Science, Technical Report MCS00-21, NEC Research Institute Technical Report 2000-172R, 2000, pp. 1-27.

R. Ramamoorthi et al., "An efficient representation for irradiance environment maps", [online], Proc. ACM SIGGRAPH 01, 2001, the Internet <URL: http://www1.cs.columbia.edu/~ravir/papers/envmap/envmap.pdf>.

R. Ramamoorthi et al., "On the relationship between radiance and irradiance: determining the illumination from images of a convex Lambertian object", J. Opt. Soc. Am. A/vol. 18, No. 10, Oct. 2001.

K. Inose et al., "Seamless Texture Synthesis Method of Multiple Textures for Constructing Entire 3D Shape from Multiple Scans", Transactions of Information Processing Society of Japan Computer Vision to Image Media, vol. 1, No. 2, Nov. 15, 2008, pp. 136-151.

Y. Iwai et al., "A Survey on Face Detection and Face Recognition", IPSJ SIG Technical Report, vol. 2005, No. 38, May 13, 2005, pp. 343-368.

* cited by examiner

COLOR IMAGE PROCESSING METHOD, COLOR IMAGE PROCESSING DEVICE, AND COLOR IMAGE PROCESSING PROGRAM

TECHNICAL FIELD

The present invention relates to image processing of a color image, in particular a color image processing method to realize a color correction of an object in a color image that is actually taken by a color imaging device and desired color reproduction of that object, and thereby to improve the texture, a color image processing device, and a color image processing program.

BACKGROUND ART

As a technique to improve the image quality of a color image taken by a color imaging device, a technique to make the color of a specific object (such as flesh color, green of plants, and a blue sky) in a color image closer to the recorded color of that object and thereby to reproduce a desirable color has been proposed.

For example, Patent literature 1 discloses a technique relating to a color correction of a color image. In Patent literature 1, a representative color is extracted from an object area in an image and RGB correction parameters are determined by comparing that representative color with a predefined center color for correction. Then, each pixel is corrected by controlling the strength at which these correction parameters are applied according to the distance from the center color. Specifically, a technique to intensively correct the color of an object by converting the color information, i.e., the RGB values of each pixel in the color image into a hue, a saturation, and a lightness, calculating a distance between that color and the center color for correction in the color space, and adjusting the correction strength according to that distance has been proposed.

In this technique, a color correction is performed based on the addition/subtraction of correction parameters in the RGB color space. For example, in the case of flesh color of a human face, the RGB correction amount is calculated for each pixel according to the distance from the center color for correction. If the face area is to be lightened in whole, a correction parameter is added to or subtracted from the RGB values of each pixel located in substantially the entire face area according to the above-mentioned distance from the center color for correction. Further, Patent literature 2 discloses a technique relating to the detection of a face area in an input image.

Patent literature 3 discloses a color correction device and method in which when a color correction is made to spectral-color image data, the spectral color is converted into a color space having dimensions lower than the original dimensions; a color correction is made in the lower-dimensional color space; and a spectral color in appropriate dimensions is generated from the lower dimensions.

Further, Patent literature 4 discloses a technique to convert an original color space into a target color space between color systems having different reference white colors, while maintaining the way in which colors are viewed unchanged from that in the original color space. Specifically, the spectral power distribution characteristic of the original reference white is restored from the color temperature of the original reference white, i.e., the reference white of the original color space. Further, the spectral power distribution characteristic of the target reference white is restored from the color temperature of the target reference white, i.e., the reference white of the target color space. Then, the surface reflectance of a given color in the original color space is restored by using the tristimulus values of the given color, the spectral power distribution characteristic of the original reference white, and the color matching functions of human beings. Further, tristimulus values, which are a color in the target color space, are obtained based on the restored surface reflectance, the restored spectral power distribution characteristic of the target reference white, and the color matching functions of human beings.

Patent literature 5 discloses a technique to automatically make an excellent white correction for an important object in a natural image that is taken under various lighting environments. Specifically, the body surface color of a specific object is extracted, and optimal color correction parameters are set for the extracted body surface color. In this way, it is possible to automatically make a color correction for an important object in a natural image taken under various lighting environments. Note that the inventions disclosed in Patent literatures 3, 4 and 5 have completely different configurations from that of the present invention described below.

Patent literature 6 proposes to apply a modeling technique for the skin reflection of a human being to the rendering of a face image. In this method, a 3D (three-dimensional) shape of a face is obtained by scanning the face by a 3D scanner. Then, a plurality of face images are obtained by illuminating the face from different viewpoints in different directions. A total reflectance and a normal vector map are estimated by using the surface scan data and the image data. Then, a transmittancy map is obtained by scanning the under-surface reflectance using a fiber-optic spectrometer. The total reflectance is separated into two components of an under-surface scattering and a (specular) surface reflectance.

CITATION LIST

Patent Literature

Patent literature 1: Japanese Patent No. 3264273 (paragraphs 0036 to 0045)
Patent literature 2: Japanese Unexamined Patent Application Publication No. 2003-317084 (paragraphs 0019 to 0021)
Patent literature 3: Japanese Unexamined Patent Application Publication No. 2004-45189
Patent literature 4: Japanese Unexamined Patent Application Publication No. 10-229499
Patent literature 5: Japanese Unexamined Patent Application Publication No. 2001-92956
Patent literature 6: Japanese Unexamined Patent Application Publication No. 2006-277748

Non Patent Literature

Non-patent literature 1: "Face detection based on Generalized LVQ" Toshinori Hosoi, Tetsuaki Suzuki, Atushi Satoh, FIT2002, I-30 (September 2002)
Non-patent literature 2: "Image engineering series 10, Color image reproduction theory, Fundamentals of color management" Joji Tajima, MARUZEN Co., Ltd. Sep. 30, 1996, p. 33-39

SUMMARY OF INVENTION

Technical Problem

The disclosures of the above-mentioned Patent literatures 1 and 2, and Non-patent literatures 1 and 2 are incorporated herein by reference. The analysis of the related art in accordance with the present invention is described hereinafter.

In the color image processing technique using the three properties of a color such as RGB and/or a hue, a saturation, and a lightness of color image data as in the case of Patent literature 1, there a problem that the original texture of an object could deteriorate.

This is because, when the color of a certain object in an image corrected so as to make the image lighter, it causes such a phenomenon that a color component originally having a high pixel value (e.g., red) is saturated while a correction parameter is added to or subtracted from other color components (green and blue). If this process is carried out for the entire area of an object, the dispersion of the color information or the pixel values in the object area become narrower, and thus deteriorating the apparent texture in the object area.

In Patent literature 6, although the human skin reflection modeling is proposed for the rendering of a face image, it requires a special measurement device, i.e., fiber-optic spectrometer. Therefore, it is very difficult to apply this technique to color corrections for ordinary color image processing.

Accordingly, it is desirable to develop color image processing that can be realized by an easier technique using only an input image and is capable of suppressing the deterioration of the texture in an object area in a color image.

An object of the present invention is to provide a color image processing method to realize desired color reproduction of the object area of a specific object in a color image taken by a color imaging device and thereby to improve the texture, a color image processing device, and a color image processing program.

Solution to Problem

An aspect of a color image processing method according to the present invention is a color image processing method including: detecting an object area based on an input image; obtaining color information and 3D information of the object area; restoring a specular component and shade contained in a body reflection component (or diffuse component) of the object area based on the color information and the 3D information; calculating an albedo by removing the specular component and the shade from the color information; restoring a surface reflectance by using the color information and the albedo; calculating a corrected albedo by correcting the albedo by using the surface reflectance; and calculating a reproduced color of the object area by adding the shade and the specular component to the corrected albedo, and thereby generating an output image.

Further, an aspect of a color image processing device according to the present invention is a color image processing device including: an image information acquisition unit that detects an object area based on an input image, and obtains color information and 3D information of the object area; a reflection information restoration unit that restores a specular component and shade contained in a body reflection component of the object area based on the color information and the 3D information; an albedo calculation unit that calculates an albedo by removing the specular component and the shade from the color information; an albedo correction process unit that restores a surface reflectance by using the color information and the albedo, and calculates a corrected albedo by correcting the albedo using the surface reflectance; and a reproduced-color calculation unit that calculates a reproduced color of the object area by adding the shade and the specular component to the corrected albedo, and thereby generates an output image.

Further, an aspect of a computer-readable recording medium storing a color image processing program according to the present invention is a computer-readable recording medium storing a color image processing program that causes a computer to execute: an image information acquisition procedure for detecting an object area based on an input image, and obtaining color information and 3D information of the object area; a reflection information restoration procedure for restoring a specular component and shade contained in a body reflection component of the object area based on the color information and the 3D information; an albedo calculation procedure for calculating an albedo by removing the specular component and the shade from the color information; an albedo correction processing procedure for restoring a surface reflectance by using the color information and the albedo, and calculating a corrected albedo by correcting the albedo using the surface reflectance; and a reproduced-color calculation procedure for calculating a reproduced color of the object area by adding the shade and the specular component to the corrected albedo, and thereby generating an output image.

Advantageous Effects of Invention

According to the present invention, it is possible to realize desired color reproduction of a certain object in a color image taken by a color imaging device and thereby to improve the texture.

DESCRIPTION OF EMBODIMENTS

Exemplary embodiments of the present invention are explained hereinafter with reference to the drawings. For clarifying the explanation, the following descriptions and drawings are partially omitted and simplified as appropriate. Components and equivalent parts having the same configuration or function are denoted by the same symbols throughout the drawings, and their duplicated explanation is omitted.

An aspect of an exemplary embodiment according to the present invention is explained. In the present invention, when the color of a specific object in an input image is to be corrected, a specular component (highlight) and a diffuse component containing shade occurring on the specific object are calculated first by using a 3D (three-dimensional) shape (also referred to as "3D information") of the specific object restored from the input image and geometrical conditions (also referred to as "geometrical information") of the lighting at the time of the image-taking. Next, a surface reflectance representing the specific object is restored with high accuracy by using color information (albedo) obtained by removing the influences of the specular component and the shade contained in the diffuse component (hereinafter called "body reflection component") from the original color information of the specific object. Then, a correction is made in such a manner that the surface reflectance is brought closer to a more desirable predefined reference surface reflectance of the object. Then, a reproduced color of the specific object is calculated by using the corrected surface reflectance as well as the specular component and the shade contained in the body reflection component. In this way, the color-corrected reproduced color of the specific object appears more naturally, and the specific object is represented by a more desirable color.

Figure 1:
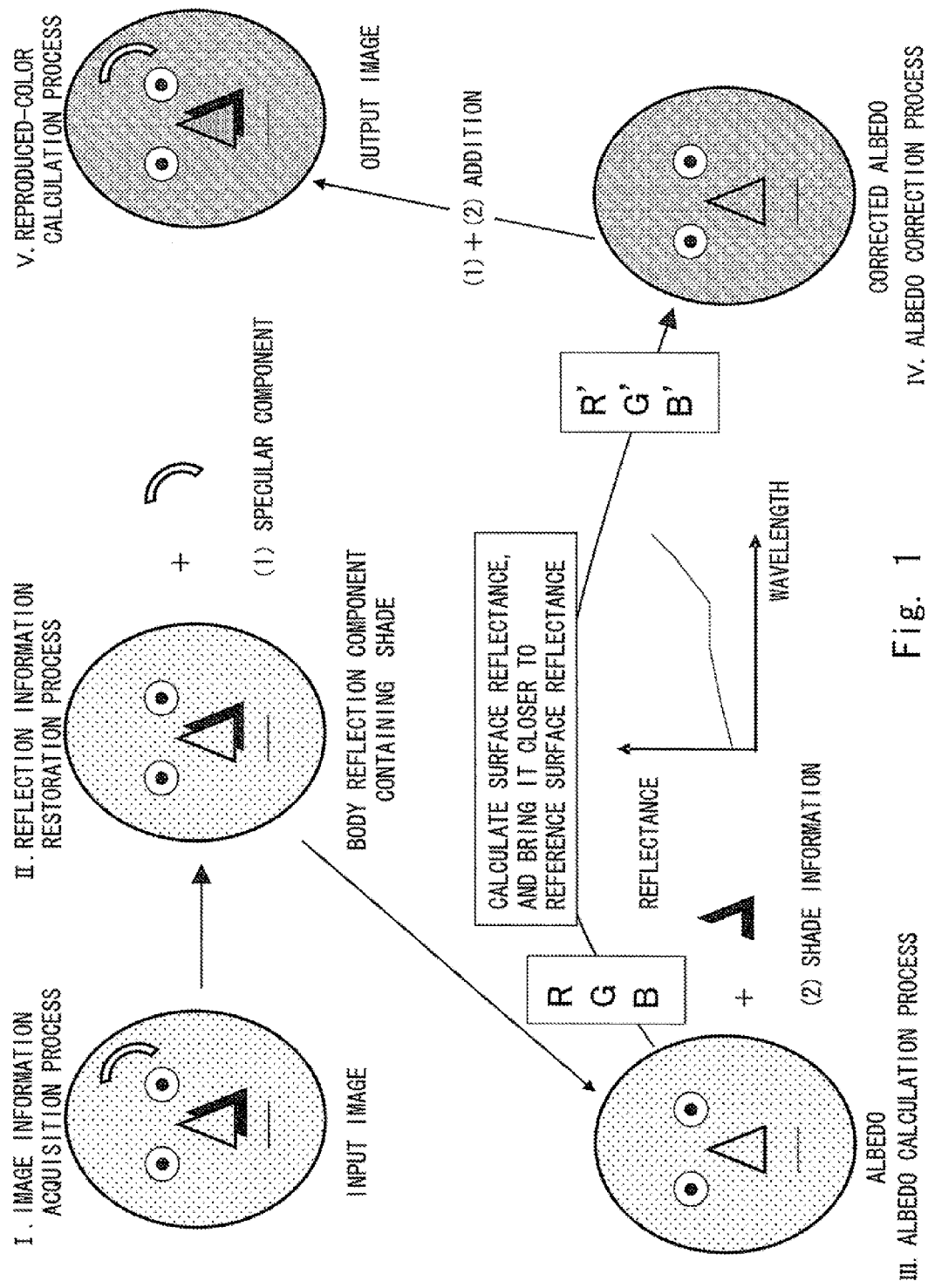
FIG. 1 is a schematic diagram showing a process flow of a color image processing method according to an aspect of an exemplary embodiment of the present invention.

FIG. 1 shows a process flow of a color image processing method according to an exemplary embodiment of the present invention.

I. Firstly, an input image and information about the input image are provided to a color image processing device (image information acquisition process). Specifically, an input image is supplied and a specific object is specified from the input image. By specifying a specific object, an area in which the albedo is to be corrected (object area) is detected. Further, a 3D shape of the specific object and color information (color of object area) are obtained.

II. Next, reflection information of the specific object is restored (reflection information restoration process). Specifically, geometrical conditions of the lighting are restored based on the 3D shape. Next, a specular component and a body reflection component containing shade are restored by using the color information, the 3D shape, and the lighting geometrical conditions. In this process, the specular component is removed from the pixel value of each pixel of the input image, and a component expressed by the product of the albedo and the body reflection component is separated. Note that the body reflection component is a component containing shade information.

III. An albedo of the specific object is calculated (albedo calculation process). Specifically, the albedo is calculated by dividing a pixel value from which the specular component is removed by the shade contained in the body reflection component.

IV. The albedo is corrected (albedo correction process). Specifically, a surface reflectance is calculated by using the color information and the albedo of the specific object. Then, the calculated surface reflectance is brought closer to a reference surface reflectance. In this way, the albedo is corrected.

V. A reproduced color of the specific object is calculated by adding the specular component and the shade contained in the body reflection component to the corrected albedo (reproduced-color calculation process).

In this specification, it is assumed that an object area detected from a specific object is composed of a plurality of pixel. Further, each pixel has color information, and the color information may be also called "pixel value". It is also assumed that the color information contains, at least, a specular component and a body reflection component, and may also contain other color information.

Further, in the following explanation, the specific object and the object area are not differentiated from each other unless otherwise specified.

The albedo is color information obtained by removing a specular component and a body reflection component from color information of shade contained in a specific object. That is, it is color information obtained by removing a specular component (glitter) and shadow contained in a body reflection component from image information (color information obtained from an input image) of a specific object. Therefore, it can be considered to be the color information of a specific object itself.

The color information of an object area is obtained (expressed) by adding the specular component to the product of the albedo and the body reflection component containing the shade. The body reflection component contains shade information.

The reference surface reflectance is a surface reflectance that is defined in advance according to the specific object. The reference surface reflectance will be further explained later.

Figure 2:
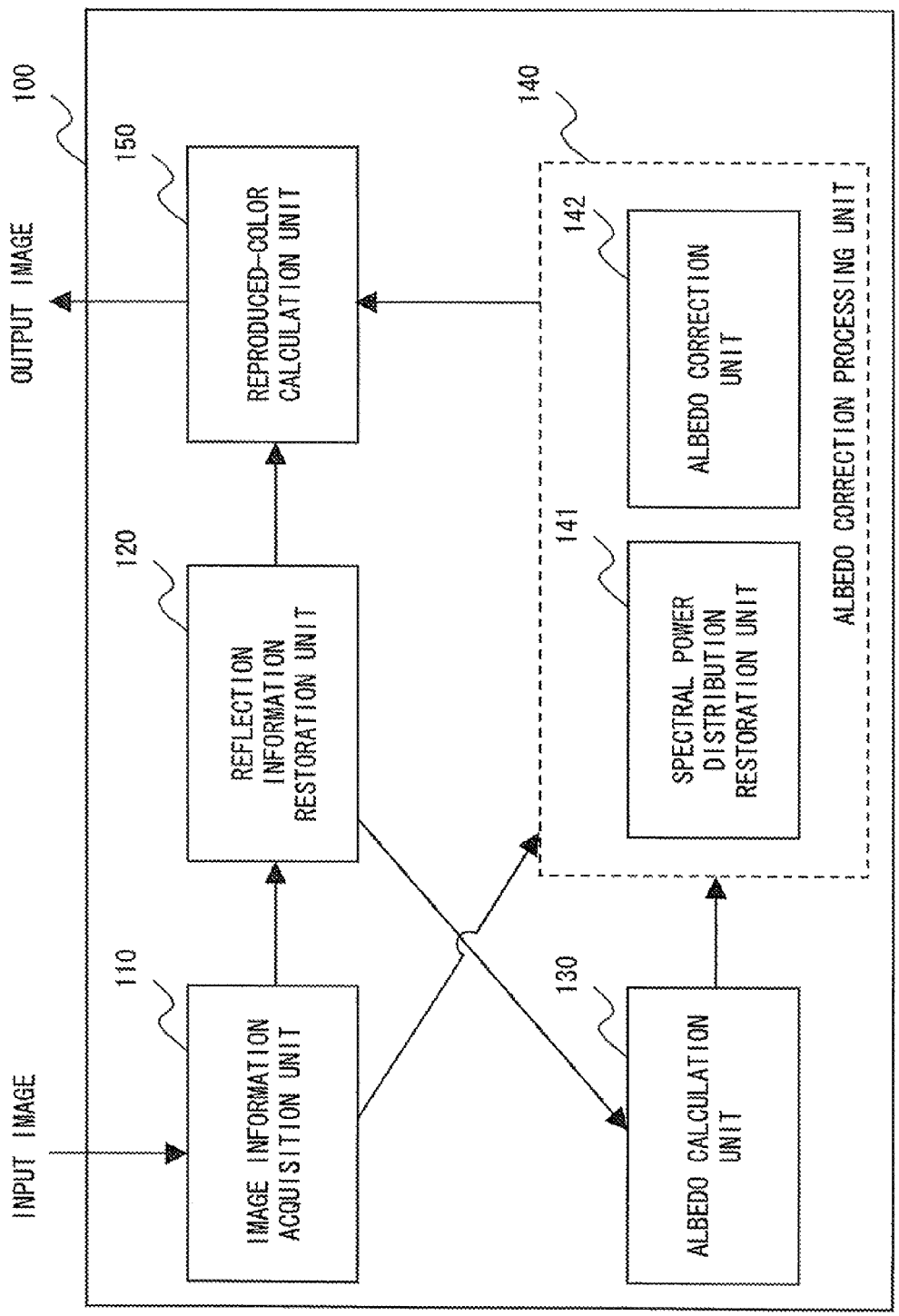
FIG. 2 is a block diagram showing a configuration example of a color image processing device according to an exemplary embodiment of the present invention.

Further, FIG. 2 shows a configuration example of a color image processing device according to an exemplary embodiment of the present invention. A color image processing device 100 includes an image information acquisition unit 110, a reflection information restoration unit 120, an albedo calculation unit 130, an albedo correction processing unit 140, and a reproduced-color calculation unit 150.

The image information acquisition unit 110 externally receives an input image, specifies a specific object based on the input image, and detects an object area of the specific object. Further, the image information acquisition unit 110 obtains color information and a 3D (three-dimensional) shape of the object area.

The reflection information restoration unit 120 restores shade information, a specular component, and a body reflection component containing shade of the object area based on the color information and the 3D shape. Specifically, the reflection information restoration unit 120 restores geometrical information of the lighting (irradiance of the lighting) by using the 3D information, and restores a specular component and a body reflection component containing shade by using the 3D shape and the lighting geometrical information. Details of these processes are explained later.

The albedo calculation unit 130 calculates an albedo by subtracting the specular component from the color information, and dividing the obtained value by the shade contained in the body reflection component.

The albedo correction processing unit 140 restores a surface reflectance by using the color information and the albedo, and calculates a corrected albedo by correcting the albedo using the surface reflectance. In this example, the albedo correction processing unit 140 includes a spectral power distribution restoration unit 141 and an albedo correction unit 142. The spectral power distribution restoration unit 141 restores a spectral power distribution of the lighting by using the color information of the object area. The albedo correction unit 142 restores a surface reflectance of the object area by using the restored lighting spectral power distribution and the albedo. Further, it calculates a corrected albedo by correcting the albedo based on the restored surface reflectance.

The reproduced-color calculation unit 150 calculates a reproduced color of the object area by adding the specular component and the shade in the body reflection component to the corrected albedo, and generates an output image by using the calculated reproduced color. The explanations are continued hereinafter with reference to specific exemplary embodiments.

[First Exemplary Embodiment]

Firstly, a process flow of a color image processing method according to a first exemplary embodiment of the present invention is explained with reference to the drawings. The following explanation is made by using a configuration example of a color image processing device 100 shown in FIG. 2.

Figure 3:
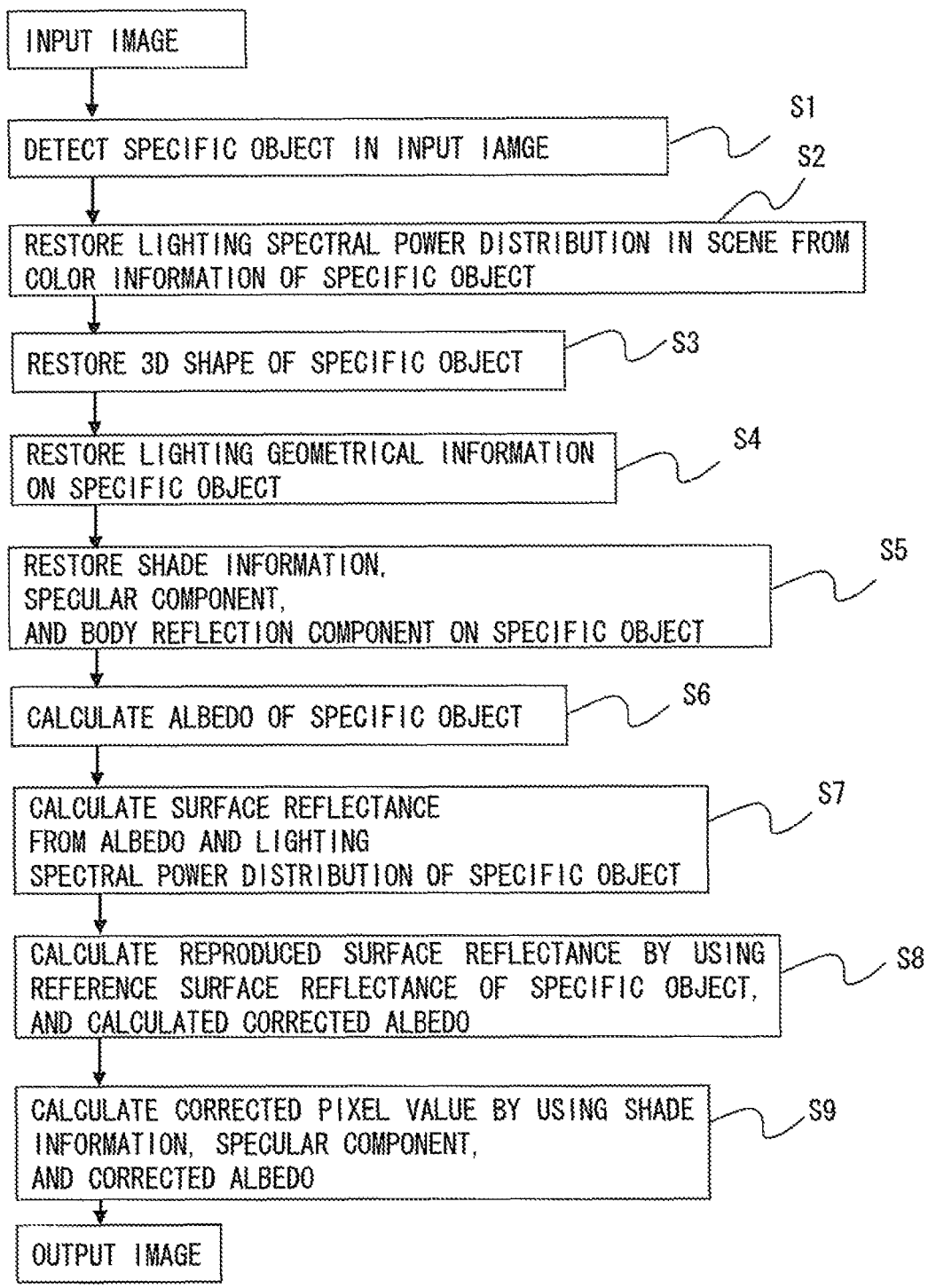
FIG. 3 is a flowchart for explaining a process example of a color image processing method according to a first exemplary embodiment of the present invention.

FIG. 3 is a flowchart for explaining a color image processing method according to the first exemplary embodiment of the present invention. For the sake of explanation, assume that the color system of the image is an RGB color system. That is, a color of an image is expressed by the combination of R (Red), G (Green) and B (Blue), and represented as "color information RGB". Note that needless to say, the present invention is applicable to color systems other than the RGB color system.

To improve the texture of a specific object in an arbitrarily-given color image in terms of image quality, the reproduced color of each pixel in the object area in the color image is re-calculated.

Note that the specific object is not limited to any particular objects, provided that, even when individuals are different from each other, i.e., even when there are individual differences, the object can be determined as the supposed object based on characteristics obtained from the color image because of the general color information and the universality of the texture.

Firstly, the image information acquisition unit 110 automatically detects a specific object from an input image (step S1). In this process, the image information acquisition unit 110 obtains color information of the object area for the detected specific object.

Figure 4:
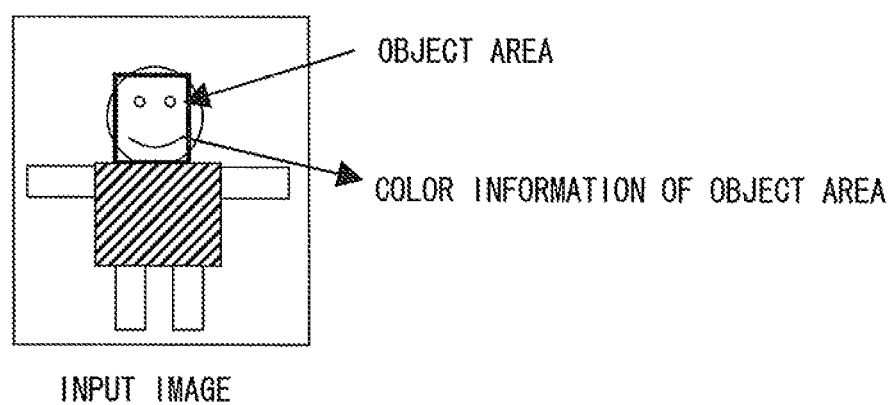
FIG. 4 is a figure for explaining a process to automatically detect an object area in an input image and to obtain color information.

As shown in FIG. 4, a specific object is detected from an input color image by using color information, texture, and the like. The following explanation is made on the assumption that the specific object is a human face. When the specific object is a human face, a face area is detected by using features such as an eye(s), a nose, and a mouth.

As a technique for detecting a face area, a face detection method disclosed in Non-patent literature 2, for example, can be used. This technique is a face detection method obtained by combining an Image-based technique with a Feature-based technique for detecting an eye(s), using generalized learning vector quantization.

Further, as a technique for detecting a face area in an input image, a method for detecting an eye(s) in an image disclosed in Patent literature 2 can be used. That is, if the position of an eye(s) is detected from an input image, a face area can be easily estimated.

Note that, in general, the above-mentioned two techniques detect a face by using monochrome information. However, it is possible to improve the accuracy of the face-area detection by incorporating an additional determination whether the detected face area is flesh color (or skin color) or not.

As for the flesh-color determination method, a technique using an image histogram disclosed in Patent literature 1 can be used. The face detection method is not limited to the above-mentioned two techniques, and other techniques may be also used.

Although a case where a face is automatically detected from an arbitrarily-given input image as the object to be detected is described in the above explanation, the object to be detected can be any objects other than faces. Note that, in order to automatically detect an object other than faces, for example, a method for automatically detecting an object by comparing visual characteristic information of the image data with visual characteristic information of a pre-registered object area can be used.

Next, the spectral power distribution restoration unit 141 restores color information of the lighting (spectral power distribution of the lighting) at the time when the input image was taken from the color information of the specific object (color of the object area) in the input image (step S2).

In this process, color information (i.e., the spectral power distribution characteristic) of the lighting (or the illumination) that is likely to be used when the input image was taken is restored by using the color information of the object area in the color image and/or the surface reflectance of the object. Specifically, color information RGB of the object area is obtained, and tristimulus values XYZ in an XYZ color system are obtained based on the obtained color information RGB. Then, a spectral power distribution is restored based on the tristimulus values XYZ of the object area in the input image and the surface reflectance of the object.

The process that is performed by the image information acquisition unit 110 to obtain color information of an object area for a specific object that is automatically detected from an input image is explained hereinafter in a more specific manner.

FIG. 4 is a figure for explaining the outline of the process for automatically detecting an object area in an input image and thereby for obtaining color information. Note that as the color information of an object area, one of a mean color, a median color (median), a mode color (mode), and the like of pixels located within the area occupied by the object can be used as the color information of the object area.

In this example, color information RGB of an object area is obtained, and tristimulus values XYZ in an XYZ color system are obtained based on the obtained color information RGB.

The following explanation is made on the assumption that, as for the color information RGB of an input image, the chromaticity of the RGB phosphor of this color information RGB and the chromaticity of white are specified in advance and that the relation between the RGB data and the emission intensity of the display device is linear.

In this case, the relation between RGB of the input image and the tristimulus values XYZ is expressed by Expression (1) shown below.

$$\begin{pmatrix} X \\ Y \\ Z \end{pmatrix} = RX \begin{pmatrix} R \\ G \\ B \end{pmatrix} \quad (1)$$

In the expression, RX is a 3-by-3 transformation matrix.

This transformation matrix RX can be uniquely calculated if the chromaticity of the RGB phosphor and the chromaticity of white are determined.

As a method for calculating the transformation matrix RX, a technique disclosed in Non-patent literature 2, for example, can be used. Further, when the currently-used color image display device is an sRGB (Standard RGB) display device, a transformation matrix specified by IEC (International Electrotechnical Commission) may be used. For Expression (1), XYZ values of black may be also incorporated as an offset term.

Next, the spectral power distribution restoration unit 141 calculates a spectral power distribution of the lighting. The lighting spectral power distribution is color information of the lighting at the time when the input image was taken. Note that "the lighting at the time when the input image was taken" is lighting (light source) that illuminates an object in an input image.

Firstly, an observation equation that is used to restore the spectral power distribution is generated from the tristimulus values XYZ of the object area in the image obtained by Expression (1) and the surface reflectance of the object.

The tristimulus values XYZ indicating the color of the object area based on the XYZ color system is expressed by Expression (2) shown below using the surface reflectance of the object area, the spectral power distribution of the lighting illuminating the object, and the color matching functions of human vision.

$$X = \int I(\lambda) R(\lambda) x(\lambda) d\lambda$$

$$Y = \int I(\lambda) R(\lambda) y(\lambda) d\lambda$$

$$Z = \int I(\lambda) R(\lambda) z(\lambda) d\lambda \quad (2)$$

In the expression, $\lambda$ is wavelength; $I(\lambda)$ is the lighting spectral power distribution; and $R(\lambda)$ is the surface reflectance of the object area. Functions $x(\lambda)$, $y(\lambda)$ and $z(\lambda)$ are color matching functions, and are known functions. The integration is performed over the wavelength range of visible rays.

When the tristimulus values XYZ calculated by Expression (1) is substituted into the left-hand side of Expression (2), Expression (2) becomes an observation equation of the lighting spectral power distribution $I(\lambda)$ and the surface reflectance $R(\lambda)$, which are unknowns. However, in the current state, $I(\lambda)$ and $R(\lambda)$, which are continuous functions of the wavelength, cannot be calculated from Expression (2).

Assuming that the surface reflectance $R(\lambda)$, which indicates the color of the object area, can be restricted or determined in advance even though it may have some degree of error, the surface reflectance $R(\lambda)$ can be handled as a known value. Therefore, Expression (2) becomes an observation equation of $I(\lambda)$ alone.

Figure 5:
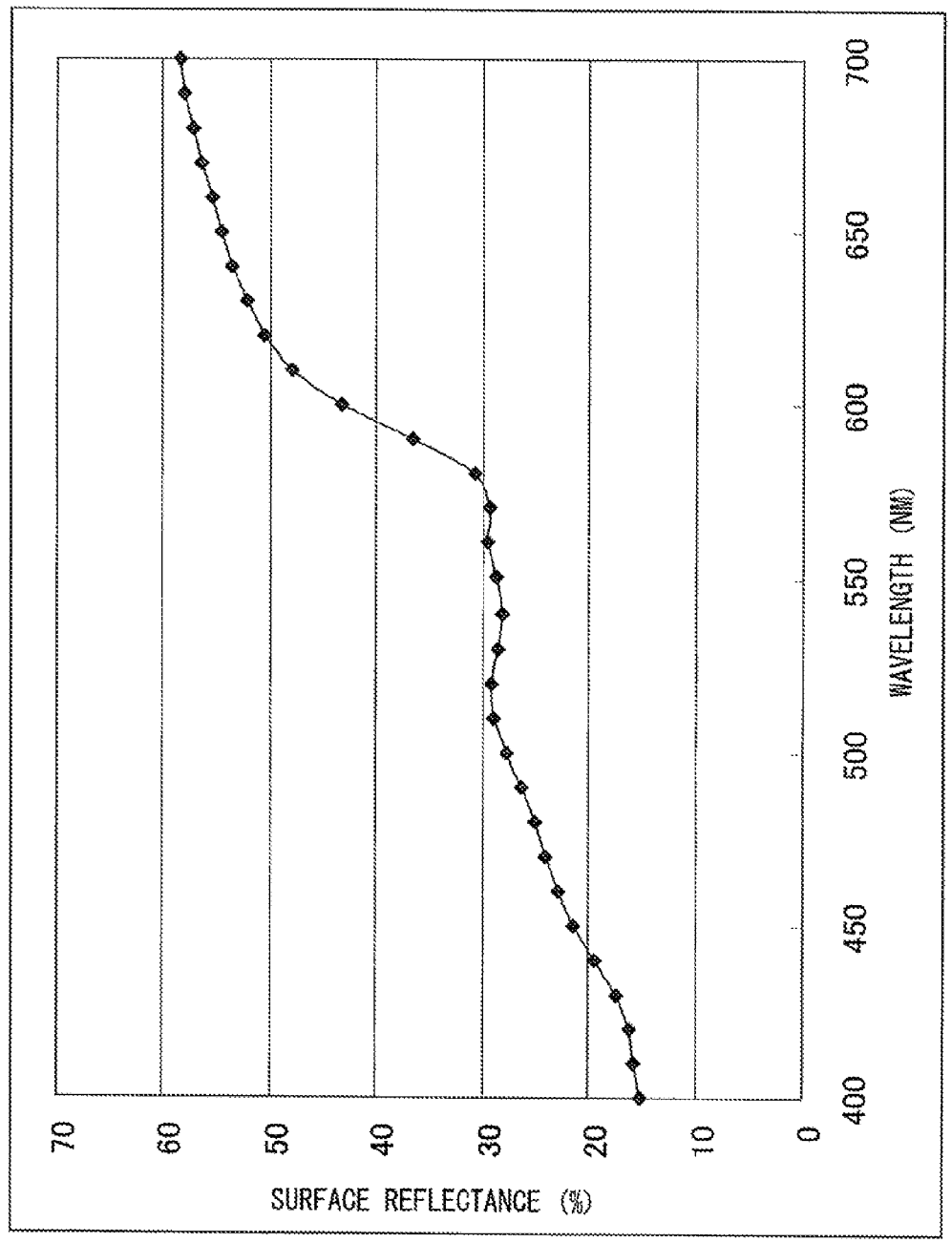
FIG. 5 is a graph showing an example of a surface reflectance of a face area of a Japanese person having average flesh color.

For example, if the object is a face of Japanese person, a surface reflectance of a face area of a Japanese person having average flesh color, which is shown in FIG. 5 as an example, can be used as $R(\lambda)$ in Expression (2). FIG. 5 is a graph showing a surface reflectance of a face area of a Japanese person having average flesh color. The horizontal axis indicates wavelength (nm) and the vertical axis indicates surface reflectance (%).

Even when the object is not a face, a surface reflectance of an object area that is selected as having an average or representative color of the surface reflectance obtained by carrying out multiple measurements on that object may be obtained in advance, and the obtained surface reflectance may be substituted into $R(\lambda)$ of Expression (2). The surface reflectance of the object area is obtained in advance and stored within the color image processing device 100 (e.g., within the albedo correction processing unit 140).

The lighting spectral power distribution $I(\lambda)$ cannot be analytically calculated from the current Expression (2), which is an observation equation of the lighting spectral power distribution $I(\lambda)$. This is because the lighting spectral power distribution $I(\lambda)$ is, intrinsically, expressed by an infinite-dimensional waveform in the visible-rays range. However, if $I(\lambda)$ can be expressed by a fewer parameters, this problem will be solved.

The CIE daylight is a light source for measurement that is specified by CIE (Comission Internationale de l'Eclairage) according to the relative spectral power distribution, and is known to be excellently approximated by a linear sum of a mean component and two principal components.

Figure 6:
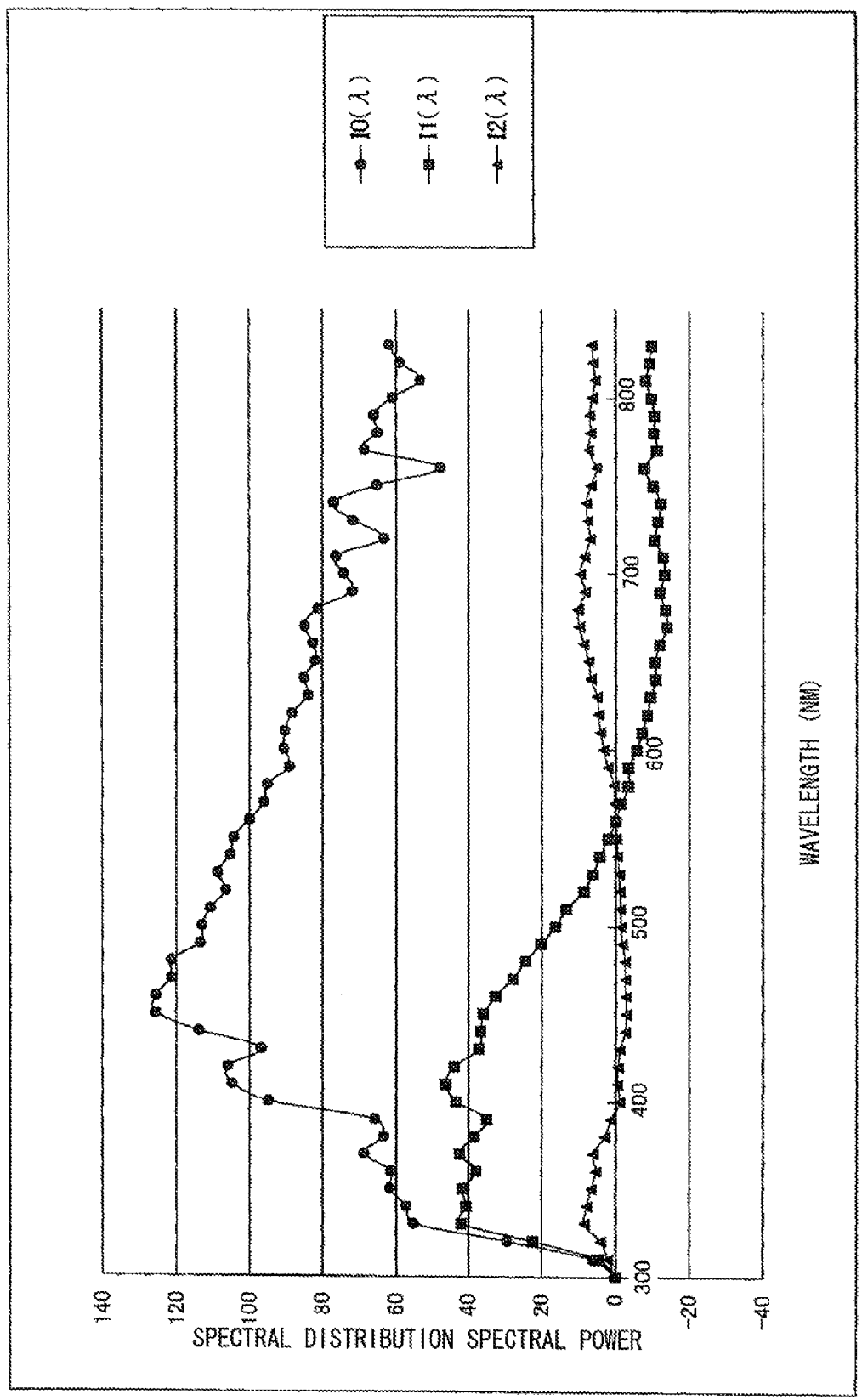
FIG. 6 is a graph showing a mean value and first and second principal component vectors of CIE daylight.

FIG. 6 is a graph showing mean and, first and second principal component vectors of CIE daylight. The horizontal axis indicates wavelength (nm) and the vertical axis indicates spectral power distribution at each wavelength of lighting or a light source.

From this graph, the lighting spectral power distribution $I(\lambda)$ can be expressed as shown blow.

$$I(\lambda) = I_0(\lambda) + a_1 I_1(\lambda) + a_2 I_2(\lambda) \quad (3)$$

The term $I_i(\lambda)$ (i=0 to 2) in Expression (3) are the mean and basis vectors of the lighting shown in FIG. 6.

The coefficients $a_i$ (i=1 to 2) are weight coefficients of respective basis vectors, and are characteristic parameters representing the color of the lighting.

By substituting $I(\lambda)$ of Expression (3) into Expression (2), linear simultaneous equations with two unknown characteristic parameters $a_1$ and $a_2$, which represent the color of the lighting, are obtained. Therefore, the characteristic parameters $a_1$ and $a_2$ are easily calculated.

By substituting the obtained characteristic parameters $a_1$ and $a_2$ representing the lighting color into Expression (3), the lighting spectral power distribution $I(\lambda)$ is obtained.

The lighting spectral power distribution obtained through the above-described procedure is used as the lighting spectral power distribution $I(\lambda)$ at the time when the input image was taken.

Next, the image information acquisition unit 110 restores a 3D shape of the specific object in the image (step S3). The explanation has been made on the assumption that the specific object is a human face. Therefore, a technique disclosed in the literature mentioned below (hereinafter called "Non-patent literature 3") can be used. In this technique, a 3D shape of a human face is estimated from a 2D (two-dimensional) image by using a face model having average 3D information on the shapes of human faces prepared in advance.

Non-patent literature 3: "Recognition of Non-Frontal Facial Images by Pose Conversion using Generic 3D Face Model" Rui Ishiyama, IEICE, General Conference 2007, D-12-085, 2007, p. 201.

The above-mentioned technique is a 3D shape restoration method specialized in the cases where the specific object is a human face. However, this technique can also restore rough 3D shapes of other specific objects from input images by extending the technique disclosed in Non-patent literature 3 to those specific objects, provided that, even when there are individual differences, the specific objects have a roughly universal shape.

Note that the fact that the 3D shape of the specific object in the input image is restored means that the normal vector $\vec{n}$ at each pixel position in the image is obtained.

The apparent color of a specific object in an input image is affected by the lighting in the scene and its geometrical conditions with respect to the object. That is, when the geometrical conditions of the lighting and the object are changed, the apparent color of the object is also changed.

Therefore, next, the geometrical conditions of the lighting with respect to the specific object in the input image are restored (step 4). In the present invention, a simple physical reflection model is applied to represent an actual apparent color. The following three literatures show techniques relating to such physical models (hereinafter called Non-patent literatures 4, 5 and 6 respectively).

Non-patent literature 4: R. Basri and D. Jacobs, "Lambertian Reflectance and Linear Subspaces", Weizmann Institute of Science, Technical Report MCS00-21 NEC Research Institute Technical Report 2000-172R. 2000, pp.1-27.

Non-patent literature 5: R. Ramamoorthi and P. Hanrahan, "An efficient representation for irradiance environment maps", [online], Proc. ACM SIGGRAPH 01, pp. 497-500, 2001. Searched on Jan. 26, 2009, the Internet <URL: http://www1.cs.columbia.edu/~ravir/papers/envmap/envmap.pdf>

Non-patent literature 6: Ravi Ramamoorthi and Pat Hanrahan: "On the relationship between radiance and irradiance: determining the illumination from images of a convex Lambertian object", J. Opt. Soc. Am. A/Vol. 18, No. 10/October 2001.

According to Non-patent literatures 4 and 5, when cast shadows and proximity lighting are ignored, the apparent irradiance E of the object area is expressed by a function of a normal vector $\vec{n}$ alone, and can be excellently approximated by using spherical surface harmonics. When distant lighting from a direction vector $\vec{\omega}$ is represented as $L(\vec{\omega})$ the irradiance on a perfectly-diffuse hemisphere object $\Omega(\vec{n})$ is expressed as shown below:

$$E(\vec{n}) = \int_{\Omega(\vec{n})} L(\vec{\omega})(\vec{n} \cdot \vec{\omega}) d\vec{\omega} \quad (4)$$

where $\vec{n}$ and $\vec{\omega}$ are unit direction vectors.

Scaling is performed on the irradiance with a surface albedo $\rho(\vec{p})$ in a position vector $\vec{p}$. Radiosity B corresponding to the luminance in the image is expressed as shown below.

$$B(\vec{p}, \vec{n}) = \rho(\vec{p}) E(\vec{n}) \quad (5)$$

Assume that lighting conditions are estimated from observed values (irradiance) on a Lambertian surface. As stated above, the lighting is a non-negative function on the surface of a convex object on the assumption that the influences of cast shadows and proximity lighting can be ignored. In Non-patent literatures 4 and 5, this function is expressed by using spherical surface harmonics.

Spherical surface harmonics $Y_{lm}$ ($l \geq 0$, $-l \leq m \leq l$) have a similar figure to a Fourier basis for a straight line or a circle on a spherical surface. Nine spherical surface harmonics ($l \leq 2$) become a constant ($l=0$), a linear expression ($l=1$), or a quadratic polynomial expression ($l=2$) in a Cartesian coordinates (x, y, z), and expressed as shown below.

$$Y_{00} = \frac{1}{\sqrt{4\pi}} B(\vec{p}, \vec{n}) = \rho(\vec{p}) E(\vec{n}) \quad (6)$$

$$(Y_{1-1}, Y_{10}, Y_{11}) = \sqrt{\frac{3}{4\pi}} (y, z, x) \quad (7)$$

$$(Y_{2-2}, Y_{2-1}, Y_{21}) = 3\sqrt{\frac{5}{12\pi}} (xy, yz, xz) \quad (8)$$

$$Y_{20} = \frac{1}{2}\sqrt{\frac{5}{4\pi}} (3z^2 - 1) \quad (9)$$

$$Y_{22} = \frac{3}{2}\sqrt{\frac{5}{12\pi}} (x^2 - y^2) \quad (10)$$

$(x, y, z) = (\sin\theta\cos\phi, \sin\theta\sin\phi, \cos\theta)$ $L(\vec{n})$ and $E(\vec{n})$ are expressed by coefficients $L_{lm}$ and $E_{lm}$ in a spherical surface harmonic expansion.

$$L(\vec{n}) = \sum_{l=0}^{\infty} \sum_{m=-l}^{l} L_{lm} Y_{lm}(\vec{n}) \quad (11)$$

$$E(\vec{n}) = \sum_{l=0}^{\infty} \sum_{m=-l}^{l} E_{lm} Y_{lm}(\vec{n}) \quad (12)$$

$A = \vec{n} \cdot \vec{\omega}$ is represented by $A_l$. Since A does not depend on the azimuth angle, only m=0 and an index l are used.

$$A(\vec{n}) = \max[\cos\theta, 0] = \sum_{l=0}^{\infty} A_l Y_{l0}(\vec{n}) \quad (13)$$

Then, from these definitions, as shown in Non-patent literature 6, $E_{lm}$ is expressed as shown below.

$$E_{lm} = \sqrt{\frac{4\pi}{2l+1}} A_l L_{lm} \quad (14)$$

Here, a variable $\hat{A}_l$ is used as shown below.

$$\hat{A}_l = \sqrt{\frac{4\pi}{2l+1}} A_l \quad (15)$$

For the rendering, the irradiance E is expressed as shown below.

$$E(\theta, \phi) = \sum_{l=0}^{\infty} \sum_{m=-l}^{l} \hat{A}_l L_{lm} Y_{lm}(\vec{n}) \quad (16)$$

Note that an analysis formula for $\hat{A}_l$ can be derived from Non-patent literature 6. $\hat{A}_l$ disappears when l is an odd number greater than one (l>1), and drops sharply as $$l^{-\frac{5}{2}}$$

when l is an even number. when l=1, $$\hat{A}_1 = \frac{2\pi}{3} \quad (17)$$

when l is an odd number greater than one (l>1), $$\hat{A}_l = 0 \quad (18)$$

when l is an even number, $$\hat{A}_l = 2\pi \frac{(-1)^{\frac{l}{2}-1}}{(l+2)(l-1)} \left[ \frac{l!}{2^l \left(\frac{l}{2}!\right)^2} \right] \quad (19)$$

When expressed by numerical values, they have following values.
$\hat{A}0=3.141593$, $\hat{A}1=2.094395$, $\hat{A}2=0.785398$, $\hat{A}3=0$
$\hat{A}4=-0.130900$, $\hat{A}5=0$, $\hat{A}6=0.0498087$ As described above, an irradiance E in each pixel of the specific object expressed by Expression (16) is obtained. That is, it means that the lighting geometrical conditions with respect to the specific object in the input image can be restored. Note that the irradiance E is regarded as the geometrical conditions.

Next, the reflection information restoration unit 120 restores (calculates) a specular component and a body reflection component containing shade in the specific object in the input image (step S5).

In general, the reflectance of an object depends on the geometrical conditions of incident light and emitted light. In general, this reflection characteristic is expressed as a BRDF (Bidirectional Reflectance Distribution Function). A BRDF is often composed of two components of a specular component and a body reflection component.

When the specific object is a living creature such as a human, the specular component and the body reflection component are defined as described below.

The specular component is a component that is reflected on the skin surface.

The body reflection component is a component of light that is generated when light temporarily enters inside the skin, and is scattered inside the skin and dispersed again through the skin.

By assuming that the surface reflection characteristic of the specific object is Lambertian, i.e., perfect diffusion, an irradiance in each pixel of the specific object is calculated by using spherical surface harmonics as shown in the step S4. Since the perfect diffusion is assumed, this irradiance E can be regarded as a diffuse reflection component (or body reflection component) DR (Diffuse Reflection) of the specific object. The irradiance E is assumed to be calculated for each color channel (e.g., R, G and B). Therefore, it is represented as "Ei". The letter "i" indicates each color channel. Similarly, the diffuse reflection component (body reflection component) is represented as "DRi".

$$Ei=DRi \quad (20)$$

The diffuse reflection component (body reflection component) is calculated on the assumption that the specific object is Lambertian. However, in practice, it contains the specular component rather than the diffuse reflection component (body reflection component). In other words, the pixel value of each color channel in an input image represents apparent brightness in that color channel containing a diffuse reflection component (body reflection component) and a specular component. The diffuse reflection component (body reflection component) is calculated by using a least squares method or the like in the object area, and therefore the irradiance does not necessarily match the pixel value. It can be safely said that the difference occurring in this discrepancy is the specular component. Therefore, a specular component SPi for each color channel of a certain pixel in the specific object area is calculated by using the following expressions.

when $SPi=Ii-Dri$, $Ii-DRi>0$ when $SPi=0$, other than that above (21)

Note that "Ii" represents the pixel value of a certain pixel in the specific object area in the input image, and "i" represents a color channel (e.g., R, G, B or the like).

The body reflection component BRi of a certain pixel in the specific object area in the input image is obtained by subtracting the specular component SPi from the pixel value Ii of the image:

$$BRi=Ii-Spi=\text{Min}(Ii,DRi) \quad (22)$$

where Min(x, y) is a function that outputs the smallest value between x and y.

Then, the luminance of the diffuse reflection component (body reflection component) DRi is shade information (shading) of the object area. The shade information represents the luminance of the diffuse reflection component (body reflection component) DRi of a certain pixel of the specific object area in the input image, and can be calculated by Expression (1). Assuming that a tristimulus value Y (Y component of the tristimulus values) calculated by Expression (1) is shade information caused by the 3D shape of the object and the geometry of the lighting, the albedo may be defined as color information obtained by removing the shade information from the color information.

Next, the albedo calculation unit 130 calculates the albedo of a certain pixel of the specific object area in the input image (step S6). Specifically, the albedo calculation unit 130 calculates an albedo ADi of each color channel of a certain pixel of the specific object area in the input image according to the following expression.

$$ADi=BRi/Y \quad (23)$$

Next, the albedo correction processing unit 140 restores a surface reflectance $R(\lambda)$ from the albedo of each pixel in the specific object in the input image and the lighting spectral power distribution (step S7).

The following explanation is made on the assumption that the input image is an image in an RGB color system.

Tristimulus values XYZ are calculated from the RGB value of each pixel expressed by the albedo ADi in the specific object area according to Expression (1), and the calculated tristimulus values XYZ is substituted into the left-hand side of Expression (2).

Then, by substituting the lighting spectral power distribution $Iorg(\lambda)$ at the time when the input image was taken, which is calculated in the step S2, into the right-hand side of Expression (2), Expression (2) becomes an observation equation of the surface reflectance $R(\lambda)$ in a certain pixel in the specific object area.

Note that since the surface reflectance of the specific object is also expressed by an infinite-dimensional waveform in the visible-rays range as in the case of the lighting spectral power distribution, it cannot be analytically calculated from the observation equation (2).

Therefore, the surface reflectance of the specific object is also represented by a model using a finite-dimensional linear model that is expressed by a weighted sum of low-dimensional basis vectors.

$$R(\lambda)=r_0(\lambda)+b_1 r_1(\lambda)+b_2 r_2(\lambda)+b_3 r_3(\lambda) \quad (24)$$

In the expression, $r_i(\lambda)$ (i=0 to 3) are basis vectors that are obtained by collecting surface reflectances of a number of objects and performing a principal component analysis on them, and represent the mean and first to third principal component vectors respectively. These vectors are all known.

The term $b_i$ (i=1 to 3) are weight coefficients for respective base vectors, and are unknown characteristic parameters representing the color of the object.

Figure 7:
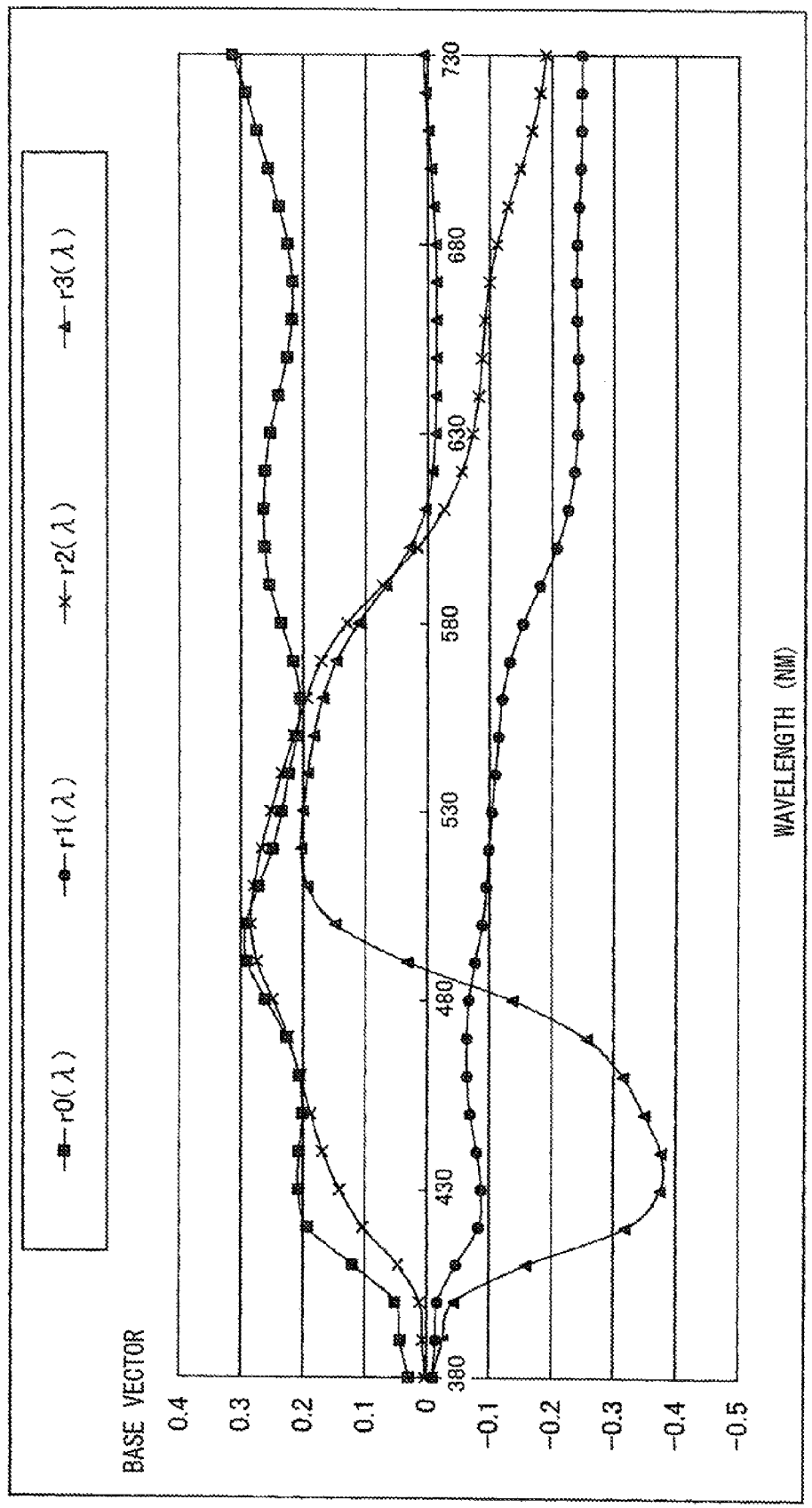
FIG. 7 is a graph showing an example of basis vectors that is obtained by collecting surface reflectances of an object and performing a principal component analysis on them.

FIG. 7 is an example of a basis vector that is obtained by performing a principal component analysis on the surface reflectance of an object. The horizontal axis indicates wavelength (nm) and the vertical axis indicates spectral power distribution spectral power at each wavelength of lighting or a light source.

Note that a basis vector that is obtained by collecting a number of surface reflectances of specific objects and performing a principal component analysis on them may be also used.

Assuming that the surface reflectance of the specific object can be expressed as Expression (24), the unknown characteristic parameters $b_1$ to $b_3$ are obtained by Expression (5), which is linear simultaneous equations with three unknowns obtained by substituting Expression (24) into the observation equation, i.e., Expression (2).

$$\begin{pmatrix} b_1 \\ b_2 \\ b_3 \end{pmatrix} = \begin{pmatrix} M(x, r_1) & M(x, r_2) & M(x, r_3) \\ M(y, r_1) & M(y, r_2) & M(y, r_3) \\ M(z, r_1) & M(z, r_2) & M(z, r_3) \end{pmatrix}^{-1} \begin{pmatrix} X - M(x, r_0) \\ Y - M(y, r_0) \\ Z - M(z, r_0) \end{pmatrix} \quad (25)$$

In the expression, $M(x, r_i)$ (i=0 to 3) are integration terms of "$\int l(\lambda) r_i(\lambda) x(\lambda) d\lambda$". This also holds true for y and z.

By substituting the characteristic parameters $b_i$ (i=1 to 3) representing the color of the object, which is obtained from Expression (25), into Expression (24), the surface reflectance in a given pixel in the object area is obtained.

Next, by using a reference surface reflectance of the object area, a reproduced surface reflectance of each pixel in the object in the input image is calculated, and a corrected albedo is thereby calculated (step S8).

The surface reflectance of each pixel in the object in the input image calculated in the step S7 is corrected based on a reference surface reflectance that is defined so that a desired color of that object area is reproduced.

Note that the reference surface reflectance of an object area is a surface reflectance that is defined so that a desired color of that object area is reproduced. More specifically, it is such a surface reflectance that the object has an excellent and desirable color (a lightness, a saturation, and a hue) in a color image that is obtained by shooting that object under the standard lighting.

Since this reference surface reflectance is subjective to individual's perception, it cannot be uniquely defined. However, the reference surface reflectance can be obtained in advance by conducting a subjectivity evaluation experiment. For example, the image quality of an object area is evaluated while changing the color of the object area to various colors by using an image processing tool. Then, for the image that is determined to be the most desirable image in the evaluation, the above-described steps S2 and S3 are applied. In this way, it is possible to obtain the reference surface reflectance of each pixel in the object area.

Note that as for the reference surface reflectance, three or more colors of the object area may be selected in advance and the surface reflectance of the pixel color corresponding to the mean color, the median color (median), or the mode color (mode) of the selected colors may be defined as the reference surface reflectance $Rref(\lambda)$ of the object area.

Further, the brightest color, the darkest color, a color having the highest saturation, and a color having the lowest saturation within the object area as well as colors that are located at both ends of the hue obtained by analyzing the color distribution within the object area may be also defined as the reference surface reflectance $Rref(\lambda)$ of that object area.

Further, when a feature in shape of an object in an input image can be used, the surface reflectance corresponding to a color at that region may be defined as the reference surface reflectance $Rref(\lambda)$ of that object area. For example, when the object is a face, a cheek, a corner of an eye, a forehead, and the like can be used as the feature region.

The mean color of pixels located within a certain range in these feature regions may be obtained and the surface reflectance of that mean color may be calculated. Then, the obtained surface reflectance may be defined as the reference surface reflectance $Rref(\lambda)$ of that object area.

By using the technique described above, the reference surface reflectance of the object area can be obtained in advance.

A reproduced surface reflectance $Rmd(\lambda)$ is calculated by correcting the surface reflectance $R(\lambda)$ of each pixel in the specific object in the input image by using the reference surface reflectance $Rref(\lambda)$. That is, by using the reference surface reflectance $Rref(\lambda)$ that is defined to excellently reproduce the color of the object area, a reproduced surface reflectance $Rmd(\lambda)$ with which a desirable color is reproduced is calculated. An example of a calculation method of a reproduced surface reflectance $Rmd(\lambda)$ is shown below:

$$Rmd(\lambda) = \alpha \cdot R(\lambda) + (1-\alpha) \cdot Rref(\lambda) \quad (26)$$

where $\alpha$ is a real number no less than zero and no larger than 1.0 ($0 \leq \alpha \leq 1.0$).

Further, another correction method shown below can be also used.

Firstly, the surface reflectance of a pixel color corresponding to the mean color, the median color (median), or the mode color (mode) of the colors in the specific object in the input image is obtained and the obtained value is defined as "$Ravg(\lambda)$". As for the reference surface reflectance, the above-described reference surface reflectance $Rref(\lambda)$ is used.

A function $F(\lambda)$ of wavelength $\lambda$ is defined as shown below.

$$F(\lambda) = Rref(\lambda)/Ravg(\lambda) \quad (27)$$

Then, the surface reflectance $R(\lambda)$ of each pixel in the specific object in the input image is corrected as shown below, and a reproduced surface reflectance $Rmd(\lambda)$ with which a desirable color is reproduced is thereby calculated:

$$Rmd(\lambda) = \alpha \cdot F(\lambda) \cdot R(\lambda) + (1-\alpha) \cdot R(\lambda) \quad (28)$$

where $\alpha$ is a real number no less than zero and no larger than 1.0 ($0 \leq \alpha \leq 1.0$).

Further, it is possible to work out so as to prevent the surface reflectance in the object area from being corrected to one surface reflectance as a result of the correction made to the surface reflectance and thereby to prevent the dispersion of the reproduced color within the object area from being narrower.

If the dispersion of the colors within the object area becomes narrower, it could cause the deterioration of the texture.

In this exemplary embodiment, the color of the object area in the image is corrected by correcting the characteristic parameters $b_i$ (i=1 to 3) constituting the surface reflectance calculated from the albedo for each pixel in the specific object area. An example of a correction formula for the characteristic parameters $b_i$ (i=1 to 3) is shown below.

$$\begin{pmatrix} b'_1 \\ b'_2 \\ b'_3 \end{pmatrix} = \begin{pmatrix} m_{11} & m_{12} & m_{13} \\ m_{21} & m_{22} & m_{23} \\ m_{31} & m_{32} & m_{33} \end{pmatrix} \begin{pmatrix} b_1 \\ b_2 \\ b_3 \end{pmatrix} \quad (29)$$

In the expression, characteristic parameters $b_i'$ (i=1 to 3) are corrected characteristic parameters. The 3-by-3 matrix is a correction matrix, and its elements $m_{ij}$ (i, j=1 to 3) are calculated in the following manner.

As described above, three or more reference surface reflectances Rref(i, λ) (i=0 to n, n≥3) are prepared in advance for the specific object. For example, if the mean color, the median color (median), the mode color (mode) of the specific object area, the brightest color, the darkest color, a color having the highest saturation, a color having the lowest saturation within the object area, or a color that is located at either end of the hue obtained by analyzing the color distribution within the object area can be used, they are the reference surface reflectances corresponding to that color or the like. Alternatively, if a feature in shape of the object in the input image can be used, they are the reference surface reflectances corresponding to the color or the like in that area.

For each of them, colors having the same property in the object area in the input image are obtained, and the surface reflectances of these colors are obtained.

That is, when the first reference surface reflectance Rref(1, λ) is the surface reflectance for the mean color in the object area in the image that is determined to be the most desirable image as described above, the surface reflectance R(1, λ) for the mean color in the object area in the input image is obtained.

Note that the characteristic parameters of Rref(1, λ) are represented as "$b_{r1,i}$ (i–1 to 3)" and the characteristic parameters of R(1, λ) are represented as "$b_{1,i}$ (i=1 to 3)".

The mean color in the object area in the input image is corrected to the center color in the object area in the image that is determined to be desirable. The characteristic parameters $b_{r1,i}$ (i=1 to 3) of Rref(1, λ) and the characteristic parameters $b_{1,i}$ (i=1 to 3) of R(1, λ) are substituted into the characteristic parameters $b_i'$ (i=1 to 3) on the left-hand side and the characteristic parameters $b_i$ (i=1 to 3) on the right-hand side, respectively, of Expression (29).

As a result, Expression (29) becomes simultaneous equations of unknown elements $m_{ij}$ (i, j=1 to 3).

By performing a similar process for each of the three or more colors of the object, the unknown elements $m_{ij}$ (i, j=1 to 3) can be solved based on the relation between the number of equations and the number of unknowns, and a correction matrix of Expression (29) is thereby obtained.

Figure 8:
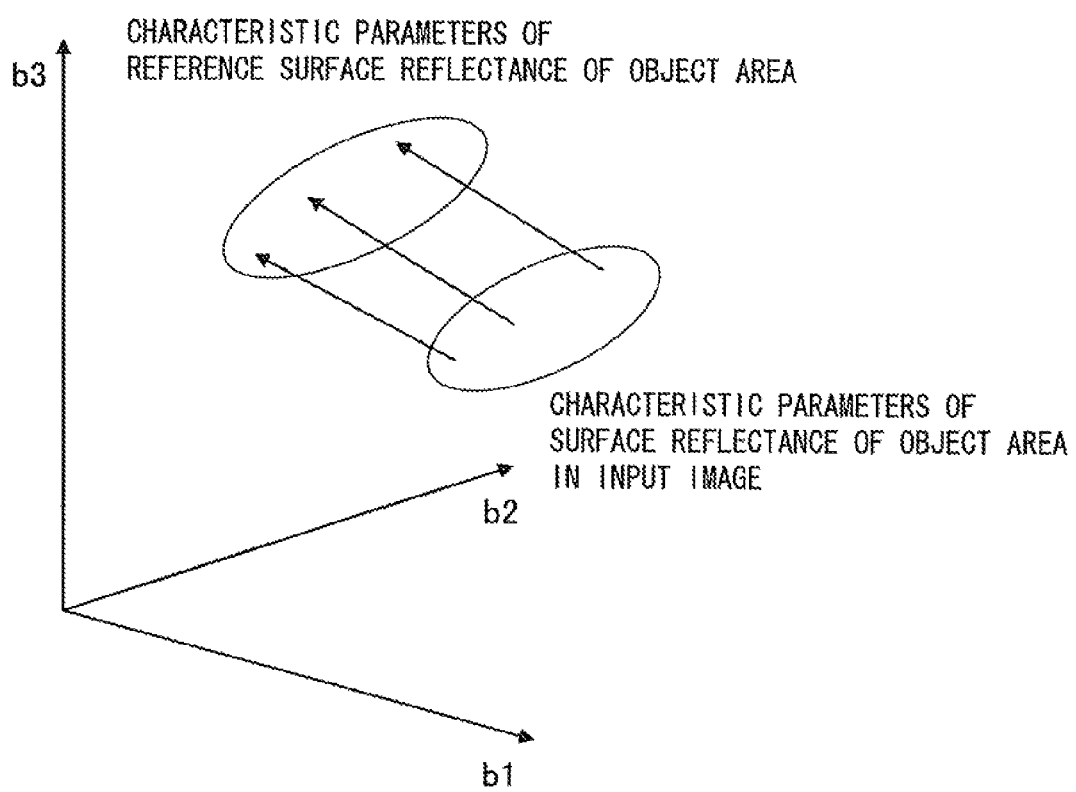
FIG. 8 shows a correction relating to a color in a object area performed in a space of characteristic parameters bi (i=1 to 3)

FIG. 8 shows the above-mentioned correlation relation for three colors in the object area in the space of the characteristic parameters $b_i$ (i=1 to 3).

As can be also seen from FIG. 8, the distribution of the characteristic parameters in the specific object area in the input image is maintained at the distribution of the characteristic parameters in the reference surface reflectance with which desired color reproduction is achieved, so that the change (unbalance and reduction) in the dispersion of the color can be suppressed. Therefore, the texture of the corrected color is not impaired.

Further, if the distribution of the characteristic parameters in the specific object area in the input image is dispersed widely, it is adjusted to the dispersion of the distribution of the characteristic parameters in the reference surface reflectance. Therefore, the deterioration of the texture that would be otherwise caused by the excessive color dispersion is also improved (reduced).

A corrected reproduced surface reflectance of each pixel in the object in the input image can be obtained by calculating corrected characteristic parameters by applying the correction matrix of Expression. (29) to the characteristic parameters $b_i$ (i=1 to 3) constituting the surface reflectance of each pixel in the object of the input image, and substituting the corrected characteristic parameters into Expression (24).

Then, for the calculation of the corrected color of each pixel in the object in the input image, tristimulus values X'Y'Z' are calculated by substituting the lighting spectral power distribution and the reproduced surface reflectance into the right-hand side of Expression (2). A corrected albedo ADi' ("i" represents a color channel) is calculated. In the case of RGB, the calculation is performed as shown below.

$$\begin{pmatrix} R' \\ G' \\ B' \end{pmatrix} = XR \begin{pmatrix} X' \\ Y' \\ Z' \end{pmatrix} \quad (30)$$

In the expression, XR is the inverse matrix of the matrix RX in Expression (1), and is a known value.

Next, a corrected color of each pixel in the object of the input image is calculated by using the corrected albedo, the shade information (luminance of diffuse reflection component), and the specular component (step S9).

A body reflection component BRi' is calculated by multiplying the corrected albedo ADi' by the luminance of the diffuse reflection component:

$$BRi' = ADi' \times Y \quad (31)$$

where Y is the luminance of the diffuse reflection component DRi, i.e., Y component of the tristimulus values obtained by Expression (1). Then, a color-corrected pixel value is obtained by adding the specular component SPi to the body reflection component BRi.

$$Ii' = Bri' + Spi \quad (32)$$

According to the above-described method, an image that is obtained by correcting the color of the object area in the input image is output as an output image.

Although a case where the device-dependent colors of the input and output images are RGB is explained in the above explanation, the present invention can be also applied to images of device-dependent colors other than RGB such as CMY and CMYK, provided that the corresponding relation between those device-dependent colors and the tristimulus values XYZ of device-independent colors can be obtained. Not that "device-dependent colors" mean a color space that depends on the device to which the image is output.

Note that in FIG. 3, the process for restoring the lighting spectral power distribution (lighting color information) in the step S2 can be performed at any processing stage before the step S7. That is, it does not necessary have to be performed in the processing order shown in FIG. 3.

Figure 9:
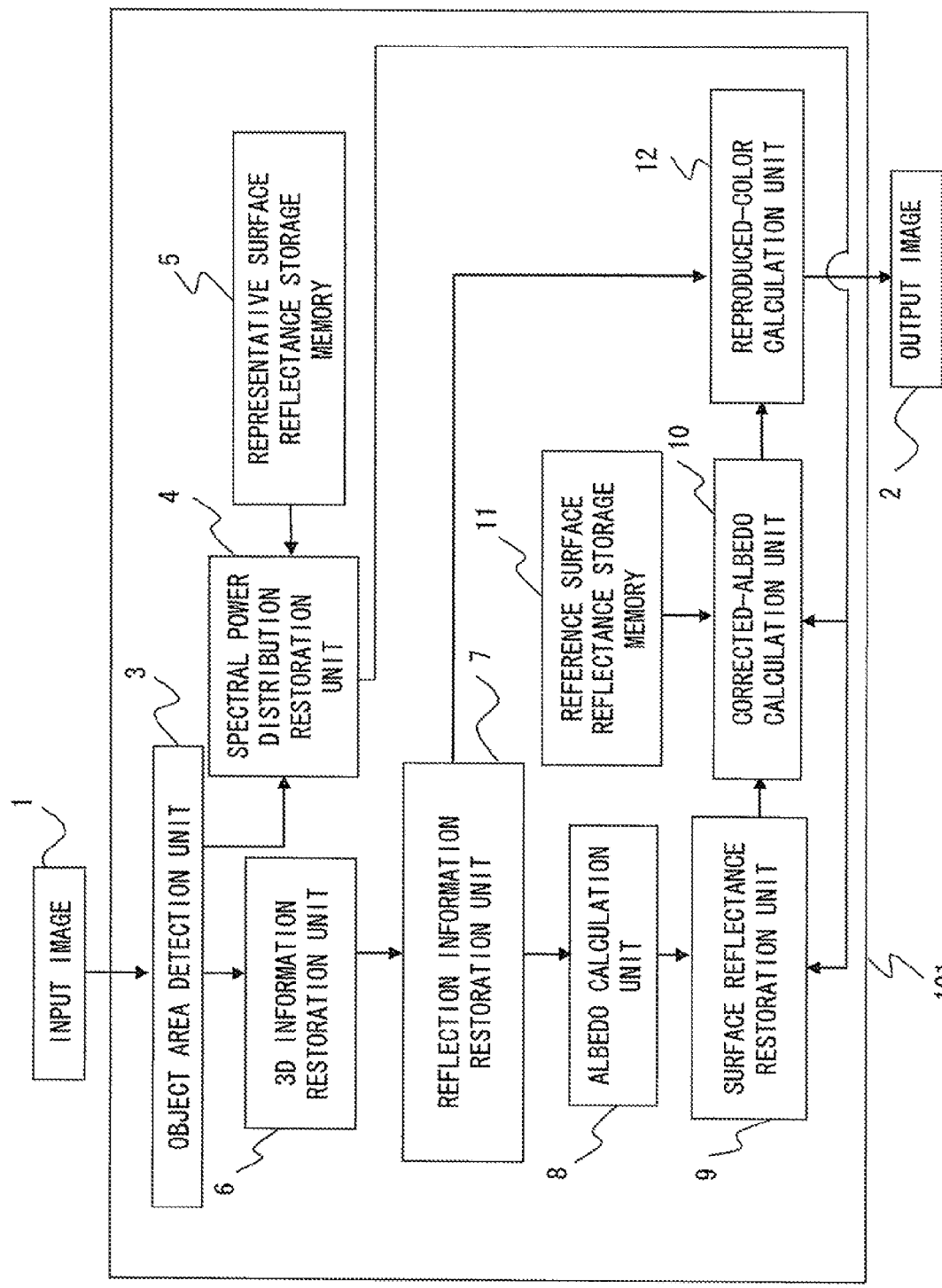
FIG. 9 is a block diagram showing a configuration example of a color image processing device according to a first exemplary embodiment of the present invention.

Next, a color image processing device (color correction device) to which the color image processing method according to the first exemplary embodiment of the present invention is applied is explained. FIG. 9 shows a configuration example of a color image processing device according to a first exemplary embodiment of the present invention.

A color image processing device 101 is a device that performs a color correction on an input image 1 and outputs a color-corrected output image 2. The color image processing device 101 includes an object area detection unit 3, a spectral power distribution restoration unit (lighting spectral power distribution restoration unit) 4, a representative surface reflectance storage memory (object area representative surface reflectance storage memory) 5, a 3D information restoration unit (object area 3D information restoration unit) 6, a reflection information restoration unit (unit for restoring a specular component and a body reflection component of an object area) 7, an albedo calculation unit (object area albedo calculation unit) 8, a surface reflectance restoration unit (object area surface reflectance restoration unit) 9, a corrected-albedo calculation unit (unit for correcting albedo by correcting surface reflectance) 10, a reference surface reflectance storage memory (object area reference surface reflectance storage memory) 11, and a reproduced-color calculation unit (object area reproduced-color calculation unit) 12.

When an input image 1 is supplied, the object area detection unit 3 analyzes the input image 1, detects a pre-assumed specific object, and outputs information indicating an object area for the detected specific object. The information indicating the object area contains color information of the object area. Specifically, the object area detection unit 3 obtains the color information of the object area through the procedure for obtaining color information of an object area explained in the first half of the step S2.

Note that the object to be detected from the input image 1 is such an object that the color and the shape feature of its object area can be limited to some extent like a human face as described above. As for the detection method, the above-described technique may be used. Note that if no object to be processed is detected from the input image 1, the input image 1 itself is output as an output image 2.

The spectral power distribution restoration unit 4 restores the lighting spectral power distribution in the input image by using the color information in the object area and a representative surface reflectance of the object area. The object area is detected by the object area detection unit 3. Specifically, the spectral power distribution restoration unit 4 obtains the lighting spectral power distribution (lighting color information) in the object area from the object area through the procedure for restoring a spectral power distribution explained in the second half of the step S2 in FIG. 3. Further, it reads a representative surface reflectance of the object area from the object area representative surface reflectance storage memory 5. Then, the spectral power distribution restoration unit 4 restores the lighting spectral power distribution through the process described in the step S2 by using the color information of the object area and the representative surface reflectance of the object area. That is, the spectral power distribution restoration unit 4 performs a process corresponding to the above-described step S2 in FIG. 3.

The object area representative surface reflectance storage memory 5 stores the representative surface reflectance of the object area (object area representative surface reflectance). The representative surface reflectance of the object area is defined in advance:

The 3D information restoration unit 6 restores a 3D shape of the object area detected by the object area detection unit 3. The 3D information restoration unit 6 performs a process corresponding to the above-described step S3.

The reflection information restoration unit 7 first restores an irradiance E in the object (lighting geometrical conditions) by using the 3D shape (i.e., normal vector) of the object area. Then, a specular component and a body reflection component containing shade are restored by using the color information, the 3D shape, and the irradiance E.

The 3D shape is calculated by the 3D information restoration unit 6. As described in the step S4 in FIG. 3, the 3D shape of the object area is a normal vector. The reflection information restoration unit 7 performs the process described in the above-described step S4 as the calculation of the irradiance.

Further, the reflection information restoration unit 7 restores (calculates) the specular component and the body reflection component in the object area according to the process method described in the above-described step S5.

The albedo calculation unit 8 calculates an albedo, which is color information from which the luminance of the body reflection component DRi, i.e., shade information obtained by the reflection information restoration unit 7 is eliminated. The calculation is performed through the process procedure described in the above-described step S6.

The surface reflectance restoration unit 9 restores a surface reflectance of each pixel in the object area from the restored lighting spectral power distribution and the albedo of the object area according the above-described method. The surface reflectance restoration unit 9 performs a process corresponding to the above-described step S7 in FIG. 3.

The corrected-albedo calculation unit 10 corrects the restored surface reflectance of each pixel in the object area by using a reference surface reflectance of the object area stored in the reference surface reflectance storage memory 11 according to the above-described method, and thereby calculates a reproduced surface reflectance. Then, it calculates an albedo to which a correction is made (corrected albedo) from the lighting spectral power distribution and the reproduced surface reflectance. The corrected-albedo calculation unit 10 performs a process corresponding to the above-described step S8 in FIG. 3.

The reference surface reflectance storage memory 11 stores a reference surface reflectance of an object area. The reference surface reflectance storage memory 11 preferably stores three or more reference surface reflectances for the object area. By using a plurality of reference surface reflectances, it is possible to bring the reproduced color closer to the color information of the specific object itself even further.

The reproduced-color calculation unit 12 calculates a corrected color of each pixel in the object in the input image by using the corrected albedo of each pixel in the object area, the luminance of the diffuse reflection component (body reflection component), i.e., shade information, and the specular component, and thereby outputs the color-corrected image as an output image. The reproduced-color calculation unit 12 performs a process corresponding to the above-described step S9 in FIG. 3.

Further, the color image processing device 101 according to the first exemplary embodiment and the color image processing device 100 shown in FIG. 2 are related to each other in the following manner.

The image information acquisition unit 110 is composed of the object area detection unit 3 and the 3D information restoration unit 6.

The reflection information restoration unit 120 corresponds to the reflection information restoration unit 7.

The albedo calculation unit 130 corresponds to the albedo calculation unit 8.

In the albedo correction processing unit 140, the spectral power distribution restoration unit 141 is composed of the spectral power distribution restoration unit 4 and the object area representative surface reflectance storage memory 5. Further, the albedo correction unit 142 is composed of the surface reflectance restoration unit 9, the corrected-albedo calculation unit 10, and the reference surface reflectance storage memory 11.

The reproduced-color calculation unit 150 corresponds to the reproduced-color calculation unit 12.

Note that the configuration of a color image processing device shown in FIG. 2 or 9 is merely an example, and any other device configurations capable of realizing similar functions may be also used.

Further, the color image processing device 101 can be implemented by using a computer, and each of the components constituting the color image processing device, i.e., the object area detection unit 3, the spectral power distribution restoration unit 4, the object area representative surface reflectance storage memory 5, the 3D information restoration unit 6, the reflection information restoration unit 7, the albedo calculation unit 8, the surface reflectance restoration unit 9, the corrected-albedo calculation unit 10, the reference surface reflectance storage memory 11, and the reproduced-color calculation unit 12 can be implemented as a program(s) that causes the central processing unit (CPU) of a computer to implement the above-described functions.

The fact that each component constituting the color image processing device can be implement by a computer and can be implemented as a program(s) is not limited to the first exemplary embodiment, and also holds true in other exemplary embodiments.

[Second Exemplary Embodiment]

Figure 10:
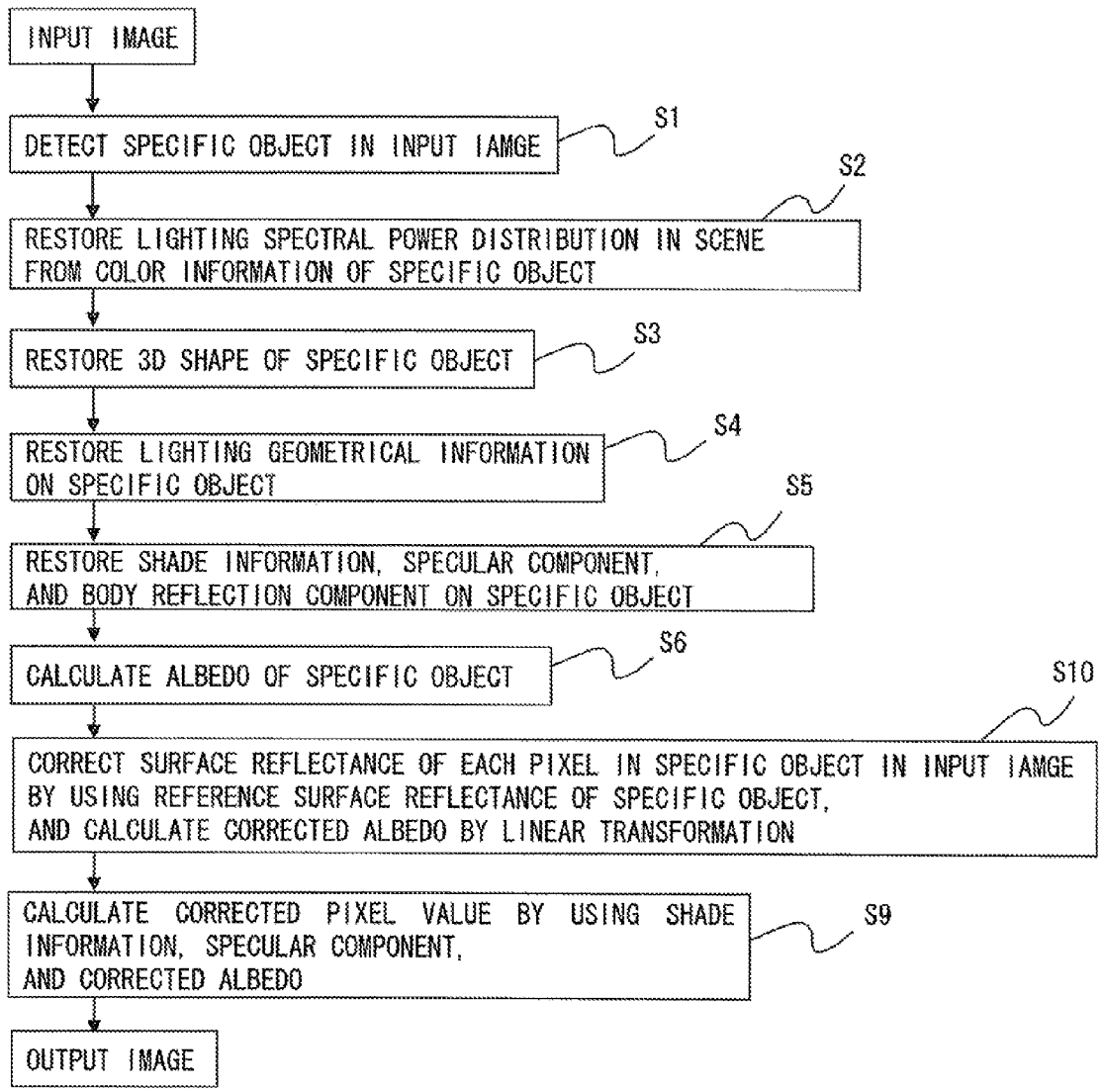
FIG. 10 is a flowchart for explaining a process example of a color image processing method according to a second exemplary embodiment of the present invention.

Next, a color image processing method according to a second exemplary embodiment is explained. FIG. 10 is a flowchart showing a color image processing method according to the second exemplary embodiment of the present invention. In the color image processing method according to the second exemplary embodiment, a process into which the two processes performed in the steps S7 and S8 (FIG. 3) of the color image processing method according to the first exemplary embodiment are combined is implemented. Specifically, both the process for restoring a surface reflectance of each pixel in an object in an input image (step S7) and the process for calculating a corrected albedo by correcting the restored surface reflectance (step S8) are replaced by a correction formula based on linear calculation. In this way, a color image processing method capable of providing a correction result equivalent to that of the color image processing method according to the first exemplary embodiment is obtained.

The steps S1 to S6 and the step S9 in FIG. 10 are similar to those of the first exemplary embodiment, and therefore their explanation is omitted. Further, a step S10 is explained hereinafter with reference to the configuration example shown in FIG. 2.

Firstly, in the step S10, the albedo correction processing unit 140 calculates a matrix composed of 3-by-3 elements $m_{ij}$ (i, j=1 to 3) in Expression (29) in the step S8 that is used to correct the surface reflectance in the object area by using the method of calculating a surface reflectance in an object area described in the step S7. Specifically, in the step S10, a calculation formula based on linear transformation that provides the same result as that of the calculation of a corrected reproduced color performed in the step S9 is constructed.

Assume that in the step S2, the spectral power distribution restoration unit 141 has restored the lighting spectral power distribution $I(\lambda)$ at the time when the input image was taken. Further, the albedo correction unit 142 restores the surface reflectance $R(\lambda)$ of a certain pixel in the object area in the input image through a process similar to the step S7 in FIG. 3. That is, characteristic parameters $b_i$ (i=1 to 3) representing the color of the object has been obtained. Then, the albedo correction unit 142 obtains a 3-by-3 correction matrix used to correct the surface reflectance through a process similar to the step S8 in FIG. 3.

As a result, characteristic parameters $b_i'$ (i=1 to 3) of a corrected surface reflectance $R'(\lambda)$ of the object area are calculated by Expression (29). Next, the corrected surface reflectance $R'(\lambda)$ is calculated by substituting the characteristic parameters $b_i'$ (i=1 to 3) into Expression (24). The corrected surface reflectance $R'(\lambda)$ is expressed as Expression (33).

$$R'(\lambda)=r_0(\lambda)+b_1'r_1(\lambda)+b_2'r_2(\lambda)+b_3'r_3(\lambda) \tag{33}$$

Corrected tristimulus values X'Y'Z' of the color of the object area are expressed as shown below.

$$X'=\int I(\lambda)R'(\lambda)x(\lambda)d\lambda$$

$$Y'=\int I(\lambda)R'(\lambda)y(\lambda)d\lambda$$

$$Z'=\int I(\lambda)R'(\lambda)z(\lambda)d\lambda \tag{34}$$

By substituting Expression (33) into the right-hand side of Expression (34) and expressing the obtained expression in a linear-transformation format, the following expression is obtained.

$$\begin{pmatrix} X' \\ Y' \\ Z' \end{pmatrix} = \begin{pmatrix} M(x,r_1) & M(x,r_2) & M(x,r_3) \\ M(y,r_1) & M(y,r_2) & M(y,r_3) \\ M(z,r_1) & M(z2r_1) & M(z,r_3) \end{pmatrix} \begin{pmatrix} b_1' \\ b_2' \\ b_3' \end{pmatrix} + \begin{pmatrix} M(x,r_0) \\ M(y,r_0) \\ M(z,r_0) \end{pmatrix} \tag{35}$$

In the expression, $M(x, r_i)$ (i=0 to 3) are integration terms of "$\int I(\lambda)r_i(\lambda)x(\lambda)d\lambda$". This also holds true for y and z. The following expression is obtained from Expressions (34), (25) and (29).

$$\begin{pmatrix} X' \\ Y' \\ Z' \end{pmatrix} = \begin{pmatrix} M(x,r_1) & M(x,r_2) & M(x,r_3) \\ M(y,r_1) & M(y,r_2) & M(y,r_3) \\ M(z,r_1) & M(z2r_1) & M(z,r_3) \end{pmatrix} \tag{36}$$

$$\begin{pmatrix} m_{11} & m_{12} & m_{13} \\ m_{21} & m_{22} & m_{23} \\ m_{31} & m_{32} & m_{33} \end{pmatrix} \begin{pmatrix} M(x,r_1) & M(x,r_2) & M(x,r_3) \\ M(y,r_1) & M(y,r_2) & M(y,r_3) \\ M(z,r_1) & M(z2r_1) & M(z,r_3) \end{pmatrix}^{-1}$$

$$\begin{pmatrix} X - M(x,r_0) \\ Y - M(y,r_0) \\ Z - M(z,r_0) \end{pmatrix} + \begin{pmatrix} M(x,r_0) \\ M(y,r_0) \\ M(z,r_0) \end{pmatrix}$$

Expression (36) can be collectively expressed as Expression (37) shown below.

$$\begin{pmatrix} X' \\ Y' \\ Z' \end{pmatrix} = A \begin{pmatrix} X \\ Y \\ Z \end{pmatrix} + B \tag{37}$$

In the expression, the matrix A is a 3-by-3 matrix expressed as Expression (38) shown below, and the matrix B is a 3-by-1 matrix expressed as Expression (39) shown below. These matrixes are both a constant matrix.

$$A = \begin{pmatrix} M(x,r_1) & M(x,r_2) & M(x,r_3) \\ M(y,r_1) & M(y,r_2) & M(y,r_3) \\ M(z,r_1) & M(z2r_1) & M(z,r_3) \end{pmatrix} \quad (38)$$

$$\begin{pmatrix} m_{11} & m_{12} & m_{13} \\ m_{21} & m_{22} & m_{23} \\ m_{31} & m_{32} & m_{33} \end{pmatrix} \begin{pmatrix} M(x,r_1) & M(x,r_2) & M(x,r_3) \\ M(y,r_1) & M(y,r_2) & M(y,r_3) \\ M(z,r_1) & M(z2r_1) & M(z,r_3) \end{pmatrix}^{-1}$$

$$B = \begin{pmatrix} M(x,r_0) \\ M(y,r_0) \\ M(z,r_0) \end{pmatrix} - A \begin{pmatrix} M(x,r_0) \\ M(y,r_0) \\ M(z,r_0) \end{pmatrix} \quad (39)$$

When Expression (37), which is used to correct the color information, is obtained, the tristimulus values XYZ of every pixel in the object area in the input image are calculated and then corrected tristimulus values X'Y'Z' are calculated by using Expression (37). Then, by using Expression (30), corrected R'G'B', i.e., a corrected albedo is obtained by using a linear transformation.

By replacing two processes by one correction formula based on linear calculation in this manner, the processing time can be reduced.

Figure 11:
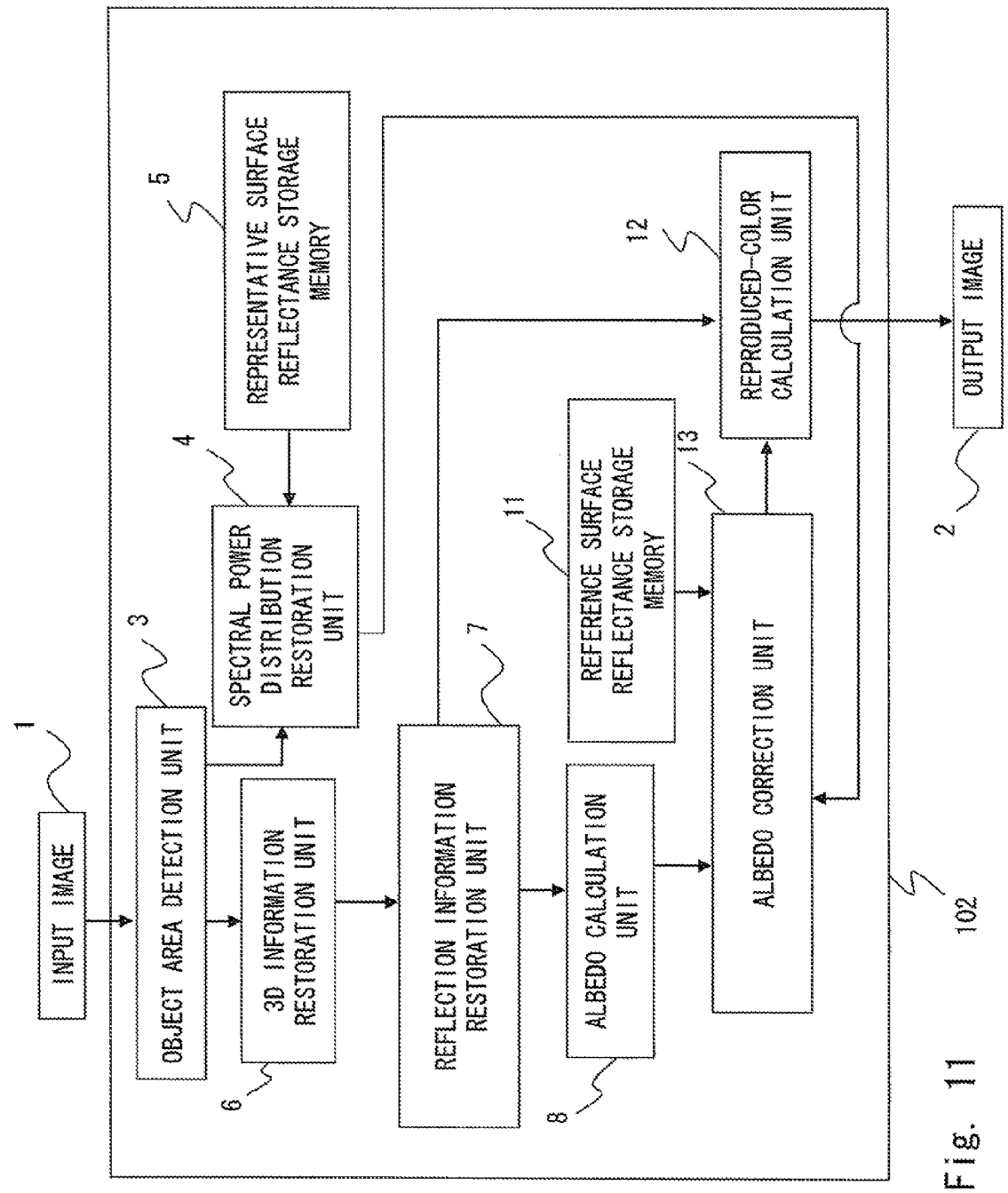
FIG. 11 is a block diagram showing a configuration example of a color image processing device according to a second exemplary embodiment of the present invention.

FIG. 11 is a block diagram showing a configuration of a color image processing device according to the second exemplary embodiment of the present invention. A color image processing device 102 according to this exemplary embodiment is a device that performs a color correction on an input image 1 and outputs a color-corrected output image 2. The color image processing device 102 includes the object area detection unit 3, the spectral power distribution restoration unit 4, the object area representative surface reflectance storage memory 5, the 3D information restoration unit 6, the reflection information restoration unit 7, the albedo calculation unit 8, an albedo correction unit 13, the reference surface reflectance storage memory 11, and the reproduced-color calculation unit 12.

The color image processing device 102 is obtained by replacing the surface reflectance restoration unit 9 and the corrected-albedo calculation unit 10 of the color image processing device 101 with the albedo correction unit 13. Therefore, only the albedo correction unit 13 is explained.

The albedo correction unit 13 performs a process corresponding to the above-described step S10 in FIG. 10. That is, the albedo correction unit 13 creates a correction formula expressed as Expression (37) that is used to correct the color of the object area. Then, the albedo correction unit 13 calculates a corrected albedo by performing a color correction expressed by Expression (37) on pixels in the object area.

Specifically, in the creation of a correction formula, the albedo correction unit 13 restores the surface reflectance of the object area by using the lighting spectral power distribution and the albedo, and creates a correction formula used to correct the albedo by using the surface reflectance. Further, the albedo correction unit 13 calculates a reproduced surface reflectance by correcting the surface reflectance using the reference surface reflectance, and creates a correction formula by using the reproduced surface reflectance. The reference surface reflectance is stored in advance in the reference surface reflectance storage memory 11.

[Other Exemplary Embodiments]

The color image processing method and device in each of the above-described exemplary embodiments can be implemented by using a computer. Each process of the color image processing method and device can be also implemented by combining two or more of software, hardware, and firmware.

For example, when the color image processing device 100 shown in FIG. 2 is implemented by using a program(s), the program (a group of commands) causes a computer to execute at least the following procedures. The program is loaded into a memory of the computer, and each command is executed under the control of the CPU.

(a) An image information acquisition procedure for receiving an input image, detecting an object area based on the input image, and obtaining color information and a 3D shape of the object area. This procedure corresponds to the image information acquisition unit 110 in FIG. 2. (b) A reflection information restoration procedure for restoring a specular component and a body reflection component containing shade of the object area based on the color information and the 3D shape. This procedure corresponds to the reflection information restoration unit 120 in FIG. 2. (c) An albedo calculation procedure for calculating an albedo obtained by subtracting the specular component and the shade in the body reflection component from the color information. This procedure corresponds to the albedo calculation unit 130 in FIG. 2. (d) An albedo correction processing procedure for restoring a surface reflectance by using the color information and the albedo, and calculating a corrected albedo by correcting the albedo using the surface reflectance. This procedure corresponds to the albedo correction processing unit 140 in FIG. 2. (e) A reproduced-color calculation procedure for calculating a reproduced color of the object area by adding shade information and the specular component to the corrected albedo, and thereby generating an output image. This procedure corresponds to the reproduced-color calculation unit 150 in FIG. 2.

Specifically, the albedo correction processing procedure is implemented through the following procedure.

(f) A spectral power distribution restoration procedure for restoring a lighting spectral power distribution by using the color information. (g) An albedo correction procedure for restoring a surface reflectance of the object area by using the lighting spectral power distribution and the albedo, and calculating a corrected albedo by correcting the albedo based on the restored surface reflectance.

More specifically, in the albedo correction procedure, a reproduced surface reflectance is calculated by correcting the surface reflectance by using a reference surface reflectance corresponding to the object area that is stored in advance in a reference surface reflectance storage memory, and the albedo is corrected by using the reproduced surface reflectance.

Further, the reference surface reflectance storage memory preferably stores three or more reference surface reflectances. In this case, in the albedo correction procedure, the surface reflectance is corrected by using three or more reference surface reflectances.

More specifically, in the spectral power distribution restoration procedure, the spectral power distribution is restored by using a predefined representative surface reflectance corresponding to the object area as well as the color information.

Further, in the albedo correction procedure, for example, a correction formula that is used to correct an albedo is created as explained in the second exemplary embodiment, and a corrected albedo is calculated by a matrix transformation using the correction formula.

Note that each of the above-described procedures is an example of a procedure that is implemented by a program, and they are not limited to those examples. Further, it is also possible to implement a part of a plurality of procedures by means of hardware and/or firmware.

The program can be provided by recording it in a recording medium, or can be provided by transmitting it through the Internet or other communication media. Note that examples of the storage media include a flexible disk, a hard disk, a magnetic disk, magneto-optic disk, a CD-ROM, a DVD, a ROM cartridge, a RAM memory cartridge with a battery backup, a flash memory cartridge, and a nonvolatile RAM cartridge. Further, examples of the communication media include a wire communication medium such as a telephone line, a radio communication medium such as a microwave line.

As has been explained so far, according to an aspect of an exemplary embodiment in accordance with the present invention, for a specific object in a color image taken by a color imaging device, it is possible to achieve desired color reproduction of the specific object area, prevent the degradation of the texture, and maintain or improve the texture.

Further, according to an aspect of an exemplary embodiment of the present invention, it is possible to solve the problem that the original texture of an object could deteriorate in color image processing using three properties of a color such as RGB and/or a hue, a saturation, and a lightness of color image data, and to achieve desired color reproduction of an object area without deteriorating the texture of the specific object in a color image taken by a color imaging device. Further, since the present invention does not require the use of a special measurement device such as a fiber-optic spectrometer, it is possible to realize an easier technique using only an input image.

Although the present invention is explained with reference to exemplary embodiments in the above explanation, the present invention is not limited to the above-described exemplary embodiments. Various modifications that can be easily understood by those skilled in the art can be made to the configurations and the details of the present invention without departing from the scope of the present invention.

This application is the National Phase of PCT/JP20101000458, filed Jan. 27, 2010, which is based upon and claims the benefit of priority from Japanese patent application No. 2009-015120, filed on Jan. 27, 2009, the disclosure of which is incorporated herein in its entirety by reference.

Industrial Applicability

The present invention is applicable to functions of implementing a color correction in color image input/output devices. Further, the present invention is also applicable as color-correcting software or utility for given color images by applying the present invention in the form of a program running on a computer system.

| Reference Signs List | |
|---|---|
| 1 | INPUT IMAGE |
| 2 | OUTPUT IMAGE |
| 3 | OBJECT AREA DETECTION UNIT |
| 4 | SPECTRAL POWER DISTRIBUTION RESTORATION UNIT |
| 5 | OBJECT AREA REPRESENTATIVE SURFACE REFLECTANCE STORAGE MEMORY |
| 6 | 3D INFORMATION RESTORATION UNIT |
| 7 | REFLECTION INFORMATION RESTORATION UNIT |
| 8 | ALBEDO CALCULATION UNIT |
| 9 | SURFACE REFLECTANCE RESTORATION UNIT |
| 10 | CORRECTED-ALBEDO CALCULATION UNIT |
| 11 | REFERENCE SURFACE REFLECTANCE STORAGE MEMORY |
| 13, 142 | ALBEDO CORRECTION UNIT |
| 100, 101, 102 | COLOR IMAGE PROCESSING DEVICE |
| 110 | IMAGE INFORMATION ACQUISITION UNIT |
| 120 | REFLECTION INFORMATION RESTORATION UNIT |
| 130 | ALBEDO CALCULATION UNIT |

-continued

| Reference Signs List | |
|---|---|
| 140 | ALBEDO CORRECTION PROCESSING UNIT |
| 141 | SPECTRAL POWER DISTRIBUTION RESTORATION UNIT |
| 150 | REPRODUCED-COLOR CALCULATION UNIT |

The invention claimed is:

1. A color image processing method comprising:
detecting an object area based on an input image;
obtaining color information and 3D information of the object area;
restoring a specular component and a body reflection component containig shade of the object area based on the color information and the 3D information;
calculating an albedo by removing the specular component and the shade in the body reflection component from the color information;
restoring a surface reflectance by using the color information and the albedo;
calculating a corrected albedo by correcting the albedo by using the surface reflectance; and
calculating a reproduced color of the object area by adding the shade in the body reflection component and the specular component to the corrected albedo, and thereby generating an output image.

2. The color image processing method according to claim 1, wherein in the restoration of the surface reflectance, a lighting spectral power distribution is restored by using the color information, and the surface reflectance of the object area is restored by using the lighting spectral power distribution and the albedo.

3. The color image processing method according to claim 2, wherein in the calculation of the corrected albedo, a reproduced surface reflectance is calculated by correcting the surface reflectance by using a reference surface reflectance that is defined in advance according to the object area and stored in a reference surface reflectance storage memory, and the albedo is corrected by using the reproduced surface reflectance.

4. The color image processing method according to claim 3, wherein
three or more reference surface reflectances are stored in the reference surface reflectance storage memory, and
in the calculation of the corrected albedo, the surface reflectance is corrected by using the three or more reference surface reflectances.

5. The color image processing method according to claim 2, wherein the lighting spectral power distribution is restored by using a representative surface reflectance that is defined in advance according to the object area in addition to the color information.

6. The color image processing method according to claim 1, wherein in the calculation of the corrected albedo, a correction formula used to correct the albedo is created, and the corrected albedo is calculated by a matrix transformation using the correction formula.

7. A color image processing device comprising:
an image information acquisition unit that detects an object area based on an input image, and obtains color information and 3D information of the object area;
a reflection information restoration unit that restores a specular component and a body reflection component containing shade of the object area based on the color information and the 3D information;

an albedo calculation unit that calculates an albedo by removing the specular component and the shade in the body reflection component from the color information;

an albedo correction processing unit that restores a surface reflectance by using the color information and the albedo, and calculating a corrected albedo by correcting the albedo using the surface reflectance; and a reproduced-color calculation unit that calculates a reproduced color of the object area by adding the shade in the body reflection component and specular component to the corrected albedo, and thereby generates an output image.

8. The color image processing device according to claim 7, wherein the albedo correction processing unit comprises:

a spectral power distribution restoration unit that restores a lighting spectral power distribution by using the color information;

a surface reflectance restoration unit that restores a surface reflectance of the object area by using the lighting spectral power distribution and the albedo; and a corrected albedo calculation unit that calculates a corrected albedo by correcting the albedo by using the surface reflectance.

9. The color image processing device according to claim 8, wherein the albedo correction processing unit further comprises a reference surface reflectance storage memory that stores a reference surface reflectance defined in advance according to the object area, and the corrected albedo calculation unit calculates a reproduced surface reflectance by correcting the surface reflectance by using the reference surface reflectance, and corrects the albedo by using the reproduced surface reflectance.

10. The color image processing device according to claim 9, wherein the reference surface reflectance storage memory stores three or more reference surface reflectances, and the corrected albedo calculation unit corrects the surface reflectance by using the three or more reference surface reflectances.

11. The color image processing device according to claim 7, wherein the albedo correction processing unit comprises:

a spectral power distribution restoration unit that restores a lighting spectral power distribution by using the color information; and an albedo correction unit that restores a surface reflectance of the object area by using the lighting spectral power distribution and the albedo creates a correction formula used to correct the albedo by using the surface reflectance, and calculates a corrected albedo by a matrix transformation using the correction formula.

12. The color image processing device according to claim 11, wherein the albedo correction processing unit further comprises a reference surface reflectance storage memory that stores a reference surface reflectance of the object area, and the albedo correction unit calculates a reproduced surface reflectance by correcting the surface reflectance by using the reference surface reflectance, and creates the correction formula by using the reproduced surface reflectance.

13. The color image processing device according to claim 8, wherein the spectral power distribution restoration unit comprises a representative surface reflectance storage memory that stores a representative surface reflectance of the object area, and the lighting spectral power distribution is restored by using the representative surface reflectance of the object area in addition to the color information.

14. A non transitory computer-readable recording medium storing a color image processing program that causes a computer to execute:

an image information acquisition procedure for detecting an object area based on an input image, and obtaining color information and 3D information of the object area;

a reflection information restoration procedure for restoring a specular component and a body reflection component containing shade of the object area based on the color information and the 3D information;

an albedo calculation procedure for calculating an albedo by removing the specular component and the shade in the body reflection component from the color information;

an albedo correction processing procedure for restoring a surface reflectance by using the color information and the albedo, and calculating a corrected albedo by correcting the albedo using the surface reflectance; and a reproduced-color calculation procedure for calculating a reproduced color of the object area by adding the shade in the body reflection component and the specular component to the corrected albedo, and thereby generating an output image.

15. The non transitory computer-readable recording medium storing a color image processing program according to claim 14, wherein the albedo correction processing procedure comprises:

a spectral power distribution restoration procedure for restoring a lighting spectral power distribution by using the color information; and an albedo correction procedure for restoring a surface reflectance of the object area by using the lighting spectral power distribution and the albedo, and calculating a corrected albedo by correcting the albedo by using the surface reflectance.

16. The non transitory computer-readable recording medium storing a color image processing program according to claim 15, wherein in the albedo correction procedure, a reproduced surface reflectance is calculated by correcting the surface reflectance by using a reference surface reflectance that is defined in advance according to the object area and stored in a reference surface reflectance storage memory, and the albedo is corrected by using the reproduced surface reflectance.

17. The non transitory computer-readable recording medium storing a color image processing program according to claim 16, wherein three or more reference surface reflectances are stored in the reference surface reflectance storage memory, and in the albedo correction procedure, the surface reflectance is corrected by using the three or more reference surface reflectances.

18. The non transitory computer-readable recording medium storing a color image processing program according claim 15, wherein the lighting spectral power distribution is restored by using a representative surface reflectance that is defined in advance according to the object area in addition to the color information.

19. The non transitory computer-readable recording medium storing a color image processing program according to claim 14, wherein in the albedo correction procedure, a correction formula used to correct the albedo is created, and the corrected albedo is calculated by a matrix transformation using the correction formula.

* * * * *